United States Patent [19]
Jatteau

[11] Patent Number: 4,860,205
[45] Date of Patent: Aug. 22, 1989

[54] SCINTILLATION CAMERA PROCESSING CIRCUITRY

[75] Inventor: Michel R. Jatteau, Paris, France

[73] Assignee: U.S. Philips Corporation, New York, N.Y.

[21] Appl. No.: 112,652

[22] Filed: Oct. 22, 1987

[30] Foreign Application Priority Data

Oct. 24, 1986 [FR] France .................. 86 14798

[51] Int. Cl.$^4$ .................. G01T 1/164; G01T 1/208
[52] U.S. Cl. .................. 364/413.24; 250/369; 250/363.02
[58] Field of Search .................. 364/414, 413.24; 250/363 S, 369

[56] References Cited

U.S. PATENT DOCUMENTS

| | | | |
|---|---|---|---|
| 4,475,042 | 10/1984 | Arseneau | 250/363 |
| 4,629,894 | 12/1986 | Lelong | 250/369 X |
| 4,692,890 | 9/1987 | Arseneau | 364/733 |

FOREIGN PATENT DOCUMENTS 2570507   3/1986   France .

OTHER PUBLICATIONS

European Patent Publication No. 265025 (Apr. 27, 1988), search report based on Application No. 87202022.

Primary Examiner—Clark A. Jablon
Attorney, Agent, or Firm—Paul R. Miller

[57] ABSTRACT

A scintillation camera which comprises a scintillation crystal, a light guide for coupling the crystal to the entrance window of an array of p photodetectors, p acquisition channels (60) which supply p electric signals, and a processor which serves to supply the coordinates $x_j$ and $y_j$ of a scintillation j and its associated energy $E_j$, is characterized in that:

(A) the p channels (60) realize the amplification, filtering and sampling of the output signals of the photodetectors, followed by A/D conversion of the samples obtained and their summing, and supply p digital signals to the input of the processor;

(B) the processor itself comprises:
  (a) a bus (150) for transferring the p digital signals;
  (b) a digital summing stage (200) which comprises a buffer memory (201), a threshold subtraction circuit (211), four digital weighted sum forming devices (221) to (224), and a threshold calculation device (231);
  (c) a scintillation processing stage which supplies the three coordinate and energy signals $x_j$, $y_j$, $E_j$ relating to the scintillation j; and (C) a detection, sequencing and storage stage (400) is provided for supplying on the one hand clock signals and on the other hand correction coefficients for the scintillation processing stage.

18 Claims, 13 Drawing Sheets

SCINTILLATION CAMERA PROCESSING CIRCUITRY

BACKGROUND

The invention relates to the field of nuclear medicine, notably to a scintillation camera which comprises a scintillation crystal which serves to convert each photon received into a scintillation, a light guide for coupling said crystal to the entrance window of an array of p photodetectors which serve to convert each scintillation into a current, p acquisition channels which receive the output signals of said photodetectors and which supply p characteristic electric signals which relate notably to the intensity of the scintillation and to the distance between the respective scintillation and each of the photodetectors, and a processor which serves to supply the coordinates $x_j$ and $y_j$ of a scintillation j and its associated energy $E_j$.

For the determination of the image of the radioactive distribution inside an organ, medical diagnostics utilizes inter alia the scintigraphy principle. This principle is based on the introduction of a radioactive element into the organism of a patient, said element attaching itself more or less to given organs, depending on whether these organs are healthy or not. The measurement of the intensity of the gamma radiation emitted provides an indication of the distribution of the radioactive element in the organism and hence forms a diagnostic aid. A measurement of this kind is performed by means of a scintillation camera.

In conventional scintillation cameras, for example Anger type cameras (the physician Anger was the first one to propose a scintillation camera whose principles are described in U.S. Pat. No. 3,011,057), the gamma rays which are representative of the radioactive distribution in the environment examined enter a scintillation crystal after having passed through a collimator. The scintillations produced in the crystal are subsequently detected by a series of photomultiplier tubes (for example, 37) after having passed through a light guide which optically couples the crystal to the tubes. The tubes are distributed in front of the optical block (crystal + light guide) so as to cover substantially the entire surfaces thereof and convert the light energy of each scintillation occurring into a measurable electric signal.

To the output of each photomultiplier tube there is connected an analog acquisition channel which successively provides amplification, integration and shaping of the signals supplied by the tube. The output signals $S_{ij}$ of the array of acquisition channels are applied to a processor which supplies, by estimation, the coordinates $x_j$ and $y_j$ of a scintillation j and its energy $E_j$ (the index i designates the relevant acquisition channel). The processor may comprise several types of calculation devices, but essentially two thereof are used in practice, i.e. a device for calculating the center of gravity on an arithmetical basis (referred to hereinafter as an arithmetical calculation device) and a device for calculating the center of gravity of a logarithmic basis (referred to hereinafter as a logarithmic calculation device).

In an arithmetical calculation device the quantities $x_j$, $y_j$, $E_j$ are given by the expressions:

$$x_j = \frac{X_j}{Z_j} \quad (1)$$

$$y_j = \frac{Y_j}{Z_j} \quad (2)$$

$$E_j = \sum_{i=1}^{i=p} G_i S_{ij} \quad (3)$$

In these expressions:

$$X_j = \sum_{i=1}^{i=p} K_i S_{ij} \quad (4)$$

$$Y_j = \sum_{i=1}^{i=p} H_i S_{ij} \quad (5)$$

$$Z_j = \sum_{i=1}^{i=p} J_i S_{ij} \quad (6)$$

The coefficients $G_i$, $K_i$, $H_i$, $J_i$ are weighting factors relating to the position of the axis of each of the p photomultiplier tubes.

In a logarithmic calculation device, the quantities $x_j$, $y_j$, $E_j$ are given by the expressions:

$$x_j = \frac{1}{a} \log \frac{X_j^+}{X_j^-} \quad (7)$$

$$y_j = \frac{1}{a} \log \frac{Y_j^+}{Y_j^-} \quad (8)$$

$$E_j = \sum_{i=1}^{i=p} G_i S_{ij} \quad (9)$$

where $$X_j^+ = \sum_{i=1}^{i=p} K_i^+ S_{ij} \quad (10)$$

$$X_j^- = \sum_{i=1}^{i=p} K_i^- S_{ij} \quad (11)$$

$$Y_j^+ = \sum_{i=1}^{i=p} H_i^+ S_{ij} \quad (12)$$

$$Y_j^- = \sum_{i=1}^{i=p} H_i^- S_{ij} \quad (13)$$

The weighting factors are again related to the position of the axis of each of the p photomultiplier tubes.

Regardless of the arithmetic used, a modified coordinate calculation has been proposed in order to improve the intrinsic spatial resolution of the camera. This modification, presently used in the majority of scintillation cameras developed for nuclear medicine and described, for example in U.S. Pat. No. 3,732,419, consists of the introduction of a threshold $s_o$ in the calculation of the composite signals $X_j$, $Y_j$, $Z_j$ or $X^+_j$, $X^-_j$, $Y^+_j$, $Y^-_j$.

More precisely, taking by way of example an arithmetical calculation device, the composite signals $X_j$, $Y_j$ are now given by the expressions:

$$X_j = \sum_{i=1}^{i=p} K_i (S_{ij} - s_o) \quad (14)$$

$$Y_j = \sum_{i=1}^{i=p} H_i (S_{ij} - s_o) \quad (15)$$

with, moreover, the convention $S_{ij}-s_o=0$ if $S_{ij}$ is smaller than $s_o$. The relations (1), (2), (3), providing $x_j$, $y_j$, $E_j$, and the relation (6) remain the same.

The introduction of such a threshold is realized by inserting a threshold circuit in each of the p analog acquisition channels. The p channels thus have two outputs: one for the signals $S_{ij}-s_o$ which enable the calculation of $X_j$ and $Y_j$, and one of the signals $S_{ij}$ used for the calculation of $Z_j$ and $E_j$. The value $s_o$ of the threshold is fixed and has been adjusted once and for all during manufacture in order to obtain the best spatial resolution for a given energy, for example 140 keV.

However, because their adjustment is independent of the real energy of the scintillations, the performance of the cameras deteriorates (notably linear distortions and resolution losses) for scintillation energies which deviate excessively from those occurring upon adjustment during manufacture. This is particularly the case when multi-isotope examinations are performed.

According to U.S. Pat. No. 4,475,042, this drawback is eliminated by utilizing a scintillation camera having a dynamic threshold which has an amplitude which is a function of the time and the energy of the scintillation being processed. This threshold (inserted, like the fixed threshold mentioned above, in the p analog acquisition channels at the output of the preamplifiers associated with the photomultiplier tubes) is formed by the sum of two signals. The first of these two signals is a fraction of the energy signal resulting from the weighted summing of the signals supplied by all preamplifiers, without threshold effect. The second signal is a fraction of the integrated energy signal which corresponds to the integrated value of the first of the two signals. If desirable, a fixed component may also be superposed on these two signals.

The threshold signal thus formed presents, as a function of time, statistical fluctuations, that is to say fluctuations linked to the number of photons relative to each of the scintillations involved in the observation. The mean value of these fluctuations is linked to the energy of the scintillation being processed. This threshold is subtracted from each of the signals supplied on the output of the preamplifiers.

The improvement offered by U.S. Pat. No. 4,475,042 enables the image quality to be maintained when a plurality of isotopes are simultaneously used.

However, in practice this solution still has considerable drawbacks:

(a) the signals forming the dynamic threshold are obtained only after deformation and delays determined by the transfer function of the circuits traversed;

(b) the dynamic threshold is a signal which fluctuates at random as a function of time and also varies from one scintillation to another, which different fluctuations and statistical variations of the relative amplitude and phase for the signals supplied by the preamplifiers and for the dynamic threshold lead to the phenomenon that the signals supplies often are, instead of being a signal zero or a useful signal, noise which degrades the spatial resolution again;

(c) the dynamic threshold is no longer suitable for high counting rates when at least a partial pile-up of the scintillations occurs because the mean value of the dynamic threshold is in that case no longer linked exclusively to the energy of the single scintillation being processed, so that it is incorrect;

(d) given tubes of the set of photomultiplier tubes involved with a given scintillation are situated in an intermediate position at such a distance from the respective scintillation that the maximum amplitude of the pulses supplied by the preamplifiers is only two or three times higher than the mean amplitude of the dynamic threshold. For the acquisition channels associated with these tubes, these output pulses are incomplete because the dynamic threshold elminates exactly the lower terminal portion of these pulses.

It is an object of the invention to propose a scintillation camera in which these drawbacks are mitigated, notably, because the above embodiments comprising a dynamic threshold are not suitable for high counting rates.

To this end, the scintillation camera in accordance with the invention is characterized in that:

(A) said p acquisition channels realize the amplification, filtering and sampling of said output signals of the photodetectors, followed by the A/D conversion of the samples obtained and their summing, and apply p digital signals to the input of the processor;

(B) the processor itself comprises:

(a) a bus for transferring said p digital signals:

(b) a digital summing stage which itself comprises:

a buffer memory which receives the p output signals $M_{ij}$ of the transfer bus;

a threshold subtraction circuit, a first input of which receives said p signals, delayed by the buffer memory, while a second input thereof receives a dependent threshold value $m_{oj}$, said subtraction circuit supplying p signals $M_{ij}-m_{oj}$ which assume the value 0 if $M_{ij}$ is smaller than $m_{oj}$;

four digital weighted sum forming devices, the first two of which receive the p signals $M_{ij}-m_{oj}$ supplied by the threshold subtraction circuit, while the other two receive directly the p output signals $M_{ij}$ of the transfer bus;

a threshold calculation device which receives the output signal of the fourth digital weighted sum forming device in order to evaluate the dependent threshold $m_{oj}$ according to a proportionality relation with the value $E_{mj}$ associated with each scintillation j, said digital summing stage supplying the following signals $X_{m,j}$, $Y_{m,j}$, $Z_{m,j}$, $E_{m,j}$ ($K_i$, $H_i$, $J_i$, $G_i$ being weighting coefficients):

$$X_{m,j} = \sum_{i=1}^{i=p} K_i(M_{ij}-m_{oj})$$

$$Y_{m,j} = \sum_{i=1}^{i=p} H_i(M_{ij}-m_{oj})$$

$$Z_{m,j} = \sum_{i=1}^{i=p} J_i M_{ij}$$

$$E_{m,j} = \sum_{i=1}^{i=p} G_i M_{ij}$$

either directly on the output of the first two digital weighted sum forming devices for the first two of these signals or via two time realignment circuits, connected to the output of the other two devices, for the last two of these signals;

(c) a scintillation processing stage which includes unpiling calculation circuits and two dividers and which supplies, on the basis of the signals $X_{mj}$, $Y_{mj}$, $E_{mj}$, $E_{mj}$, the three coordinate and energy signals $x_j$, $y_j$, $E_j$ relating to the scintillation j;

(C) a detection, sequencing and storage stage which receives a signal which corresponds to the sum of the p output signals of the photodetectors is provided in order to supply on the one hand the various clock signals for synchronising the elements of the p acquisition channels and the elements of the processor, and on the other hand the correction coefficients for the scintillation processing stage.

In two alternative embodiments of the proposed camera the processor can utilize only one of the two quantities Z or E for calculating the coordinates, taking into account the later correction possibilities offered by contemporary scintillation cameras. In that case the processor comprises only three digital weighted sum forming devices, the first two of which receive the p signals $M_{ij}-m_{oj}$ supplied by the threshold subtraction circuit, while the third device directly receives the p output signals $M_{ij}$ of the transfer bus. The threshold processing device thus receives the output signal of said last digital weighted sum forming device for the evaluation of the dependent threshold $m_{oj}$ according to a proportionality relation with the value $E_{mj}$ associated with each scintillation j.

In the first of these two alternative embodiments, the digital summing stage supplied the following signals $X_{m,j}$, $Y_{m,j}$, $Z_{m,j}$ ($K_i$, $H_i$, $J_i$ being the weighting coefficients):

$$X_{m,j} = \sum_{i=1}^{i=p} K_i (M_{ij} - m_{oj})$$

$$Y_{m,j} = \sum_{i=1}^{i=p} H_i (M_{ij} - m_{oj})$$

$$Z_{m,j} = \sum_{i=1}^{i=p} J_i M_{ij}$$

either directly on the output of the first and the second digital weighted sum forming device for the first two of these signals or via a time realignment circuit, connected to the output of the third device, for the last one of these signals.

In the second alternative embodiment, the digital summing stage supplies the following signals $X_{m,j}$, $Y_{m,j}$, $E_{m,j}$ ($K_i$, $H_i$, $G_i$ being the weighting coefficients):

$$X_{m,j} = \sum_{i=1}^{i=p} K_i (M_{ij} - m_{oj})$$

$$Y_{m,j} = \sum_{i=1}^{i=p} H_i (M_{ij} - m_{oj})$$

$$E_{m,j} = \sum_{i=1}^{i=p} G_i M_{ij}$$

These signals are also applied either directly on the output of the first and the second digital weighted sum forming device for the first two of these signals, or via a time realignment circuit, connected to the output of the last device, for the last one of these signals.

As a result of the use of the threshold dependent on the energy of the scintillations as well as on the pile-up effect of these scintillations, in both camera embodiments an optimum spatial resolution can be obtained, regardless of the counting rate, throughout the entire energy spectrum of the radiation used. The scintillation camera thus obtained is faster and has a superior performance in comparison with the previous embodiments and, moreover, is particularly suitable for multi-isotope examinations.

BRIEF DESCRIPTION OF THE DRAWINGS

The particularities and advantages of the invention will become apparent from the following detailed description, given by way of example, with reference to the accompanying diagrammatic drawings; and therein.

DETAILED DESCRIPTION

In the scintillation camera comprising p acquisition channels and utilizing converter-integrator circuits such as the device described in French Patent Application FR-A-No. 2,540,995 or the device described in French Patent Specification FR-A-No. 2,552,233, the signals obtained on the output of the acquisition signals are a measure of the charge of the electric pulses supplied by the respective photomultiplier tubes in response to a scintillation.

Figure 1:
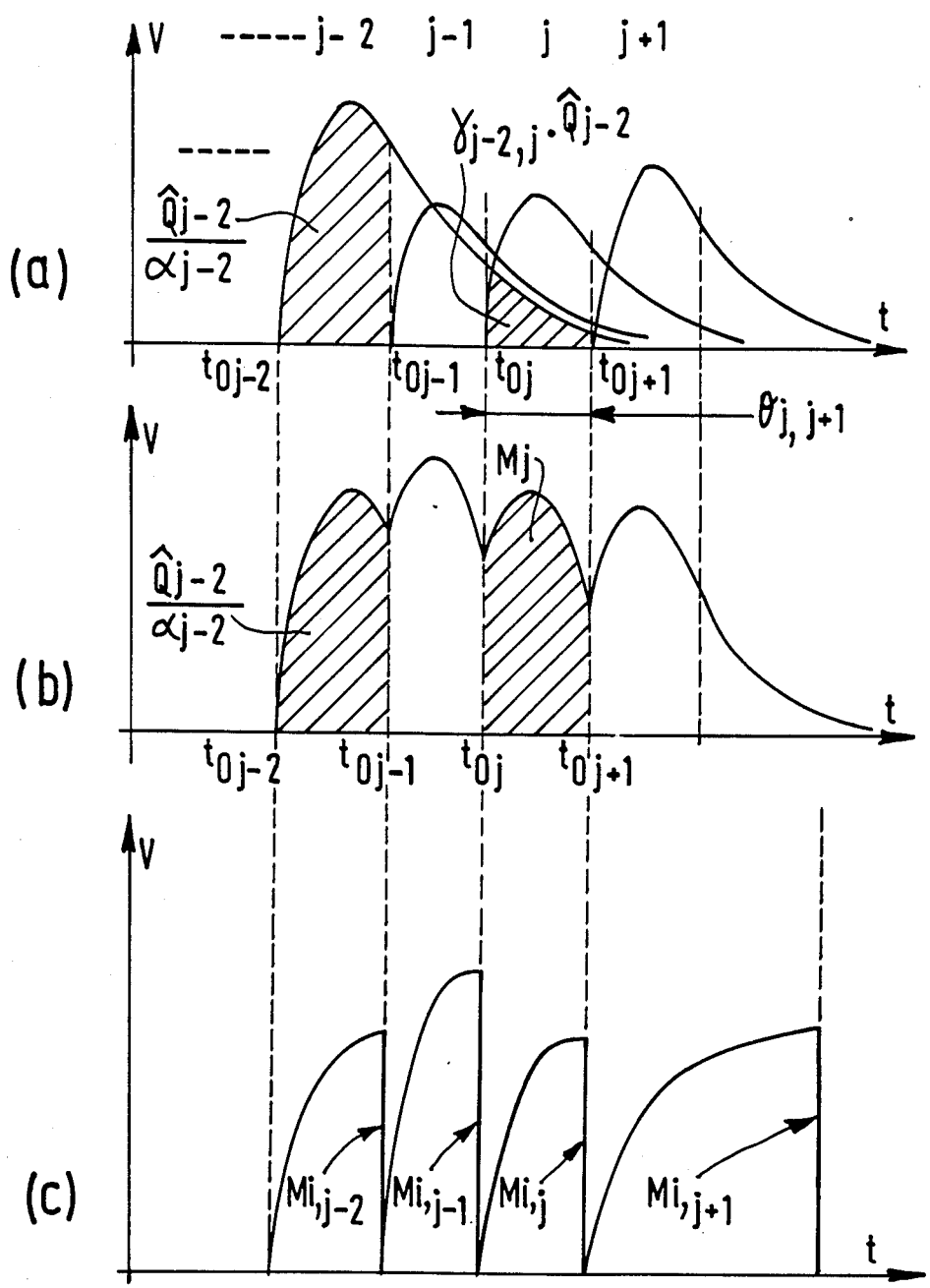
FIGS. 1a to 1c respectively show the shape of the individual signals corresponding to approximated scintillations causing a partial pile-up (FIG. 1a), the shape of the overall signal resulting from this pile-up (FIG. 1b), and the shape of the signal which represents for each scintillation j the value which is measured at the instant $t_{o,j+1}$ and which results from the summing of the samples during the time interval $\theta_{j,j+1}$ for the acquisition channel i (FIG. 1c).

For example, in the absence of a pile-up effect, the acquisition channel i (i varying from 1 to p) will supply a signal $S_{ij}$ in response to a scintillation j occurring at a point $x_j$, $y_j$ of the scintillation crystal. However, if a pile-up of scintillations occur as illustrated by way of example in FIG. 1a, showing the individual signals corresponding to the approximated scintillations causing a partial pile-up, the signal $M_{ij}$ (see FIG. 1c which shows the shape of the successive signals $M_{ij}$) supplied by the acquisition channel i for a scintillation j and measured at the end of the time interval $\theta_{j,j+1}=t_{o,j+1}-t_{o,j}$ during which this scintillation j is disturbed neither by the preceding scintillations nor by the subsequent scintillations, is no longer $S_{ij}$ but a signal that is a function of $S_{ij}$ and the values $S_{ij}$ ($k=j-1, j-2, \ldots, j-q+1, j-q$) corresponding to the q preceding scintillations which participate in the disturbing of the scintillation j.

More precisely, it can be demonstrated that for each of the acquisition channels the measured signal $M_{ij}$ has the following theoretical shape:

$$M_{ij} = \frac{S_{ij}}{\alpha_j} + \sum_{k=j-1}^{k=j-q} \gamma_{kj} S_{ik} \quad (16)$$

In this relation (16), the coefficients $\alpha_j$ and $\gamma_{kj}$ are correction coefficients that are predetermined on the basis of the fact that the mean shape as a function of time of the analog pulses applied to the input of the acquisition channels is known. The coefficients $\alpha_j$, obtained by extrapolation, are only a function of the measurement time interval $\theta_{j,j+1}$. The coefficients $\alpha_j$, being larger than 1, thus tend towards the value 1 if the duration of the measurement time interval $\theta_{j,j+1}$ becomes very long. The coefficients $\gamma_{kj}$, obtained by interpolation, are a function of the time interval $\theta_{kj}$ which separates each preceding scintillation j-1, j-2, etc... from the scintillation j and which is expressed by the relation $\theta_{kj}=t_{o,j}-t_{o,k}$, where $k=j-1, j-2, \ldots, q-1, q$. The coefficients $\gamma_{kj}$, being smaller than 1, will tend towards the value 0 if the duration of the intervals $\theta_{kj}$ becomes very long.

In FIG. 1a, the electric charge to be determined, being denoted as $\hat{Q}_j$ and being proportional to the amount of current flowing during the period $\theta_{j,j+1}$ of the individual signal associated with the scintillation j, is estimated on the basis of the measurement $M_{ij}$ performed during this period and on the basis of the q changes $Q_k$ previously estimated. FIG. 1b shows the sum signal, or composite signal, resulting from the pile-up of the individual signals (of FIG. 1a) corresponding to a plurality of scintillations approximated in the time. FIG. 1c shows the shape of the successive signals $M_{i,j}$.

When the case is considered where no pile-up occurs, the processor included in the camera and enabling notably the evaluation of the energy $E_j$ of each scintillation on the basis of the signals supplied by the p acquisition channels, performs this calculation by means of the following weighted sum (relation (3)):

$$E_j = \sum_{i=1}^{i=p} G_i S_{ij}$$

However, in the case of a pile-up of scintillations, the quantity $E_{mj}$ is given by:

$$E_{mj} = \sum_{i=1}^{i=p} G_i M_{ij} \quad (17)$$

or in accordance with the relation (16):

$$E_{ij} = \frac{E_j}{\alpha_j} + \sum_{k=j-1}^{k=j-q} \gamma_{kj} E_k \quad (18)$$

For the evaluation of the coordinates $x_j, y_j$ of each scintillation j by the processor on the basis of the signals supplied by the p acquisition channels, independent of the fact of whether or not a pile-up of scintillations has occurred, in accordance with the invention there is introduced a threshold $m_{oj}$ which varies from one scintillation to another.

The processor forms the following weighted sums during a first period:

$$X_{mj} = \sum_{i=1}^{i=p} K_i (M_{ij} - m_{oj}) \quad (19)$$

$$Y_{mj} = \sum_{i=1}^{i=p} H_i (M_{ij} - m_{oj}) \quad (20)$$

$$Z_{mj} = \sum_{i=1}^{i=p} J_i M_{ij} \quad (21)$$

where $M_{ij}-m_{oj}=0$ if $M_{ij}$ is smaller than or equal ot $m_{oj}$. In these relations (19) to (21) the weighting factors are, for example the same as before.

It can be demonstrated that the value of the threshold $m_{oj}$ is attractively taken to be proportional to the value $E_{mj}$ obtained by means of the relations (17) and (18); however, it is not to be understood that this is not the only possible choice. The proportionality factor is referred to as $f_o$ and is expressed in V/eV if $m_{oj}$ is a voltage and if $E_{mj}$ is expressed in electron volts, so that:

$$m_{oj} = f_o \cdot E_{mj} \quad (22)$$

$$m_{oj} = f_o \cdot \left( \frac{E_j}{\alpha_j} + \sum_{k=j-1}^{k=j-q} \gamma_{kj} E_k \right)$$

It follows from this expression that, in the absence of a pile-up corresponding to the values $\alpha_j=1$ and $\gamma_{kj}=0$, the dependent threshold takes the value $s_{oj}=f_o.E_j$, and that the signals supplied by the p acquisition channels are the signals $S_{ij}$. In these circumstances (absence of pile-up), the relations (19), (20), (21) can be written as:

$$X_j = \sum_{i=l}^{i=p} K_i (S_{ij} - s_{oj}) \quad (23)$$

$$Y_j = \sum_{i=l}^{i=p} H_i (S_{ij} - s_{oj}) \quad (24)$$

$$Z_j = \sum_{i=l}^{i=p} J_i S_{ij} \quad (25)$$

The weighted sums are not subject to errors due to the pile-up and the calculation of the coordinates in accordance with the relations (1) and (2) is direct.

However, in the case of a pile-up of scintillations, taking into account the expressions (16), (22) and (23) to (25), the weighted sums (18) to (21) can be expressed as follows:

$$X_{mj} = \frac{X_j}{\alpha_j} + \sum_{k=j-1}^{k=j-q} \gamma_{kj} X_k \quad (26)$$

$$Y_{mj} = \frac{y_j}{\alpha_j} + \sum_{k=j-1}^{k=j-q} \gamma_{kj} Y_k \quad (27)$$

$$Z_{mj} = \frac{Z_j}{\alpha_j} + \sum_{k=j-1}^{k=j-q} \gamma_{kj} Z_k \quad (28)$$

After this weighted sum forming operation, performed during a first period of time, a second operation must be performed, i.e. the processing of the piled-up scintillation in order to determine, on the basis of the weighted sums (26) to (28), the real coordinates $x_j, y_j$ of each scintillation. This operation can be performed in various ways which will be described in detail hereinafter in the description of the embodiments of the scintillation camera in accordance with the invention.

Figure 2:
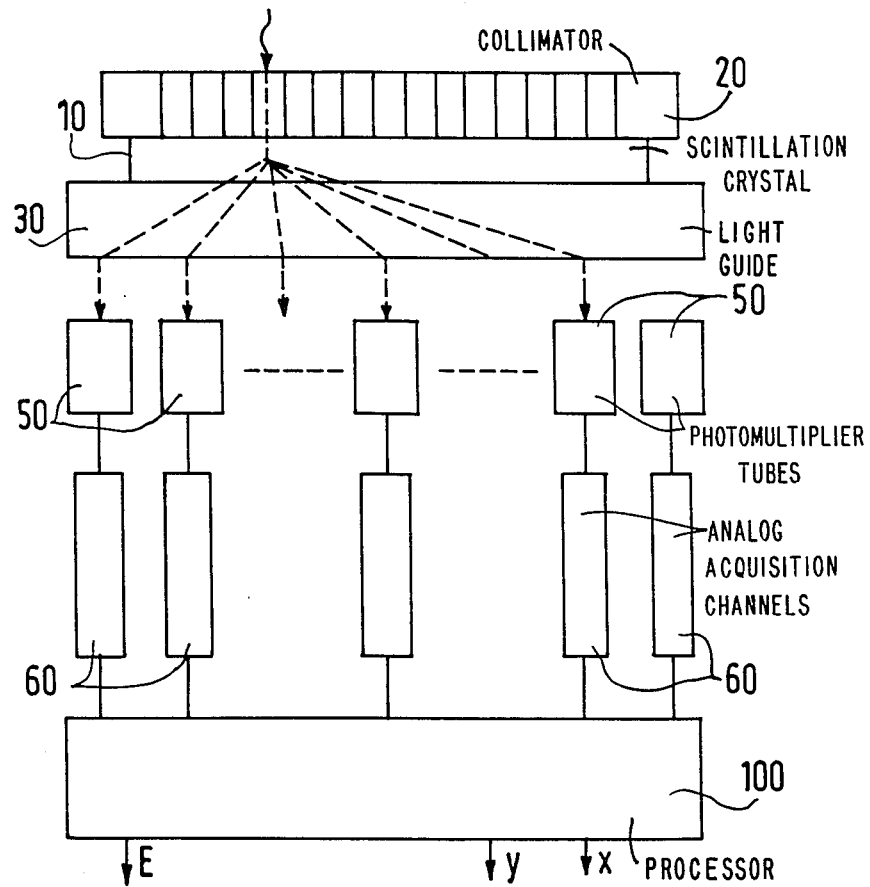
FIGS. 2 and 3 show the circuit diagram of a scintillation camera in accordance with the present state of the art and in accordance with the invention, respectively.

A conventional scintillation camera as shown in FIG. 2 comprises a scintillation crystal 10 which is provided with a collimator 20 and which serves to convert each photon received into a scintillation. Via a light guide 30, the crystal is coupled to the entrance window of an array of p photodetectors which are in this case formed by photomultiplier tubes 50. The tubes 50 convert each scintillation into a current which is then processed by p fully analog acquisition channels 60. The acquisition channels 60 realize notably the amplification, filtering, integration and shaping of the output signals of the photomultiplier tubes 50 and are followed by a processor 100 which supplies the coordinates $x_j$, $y_j$ and the energy $E_j$.

Figure 3:
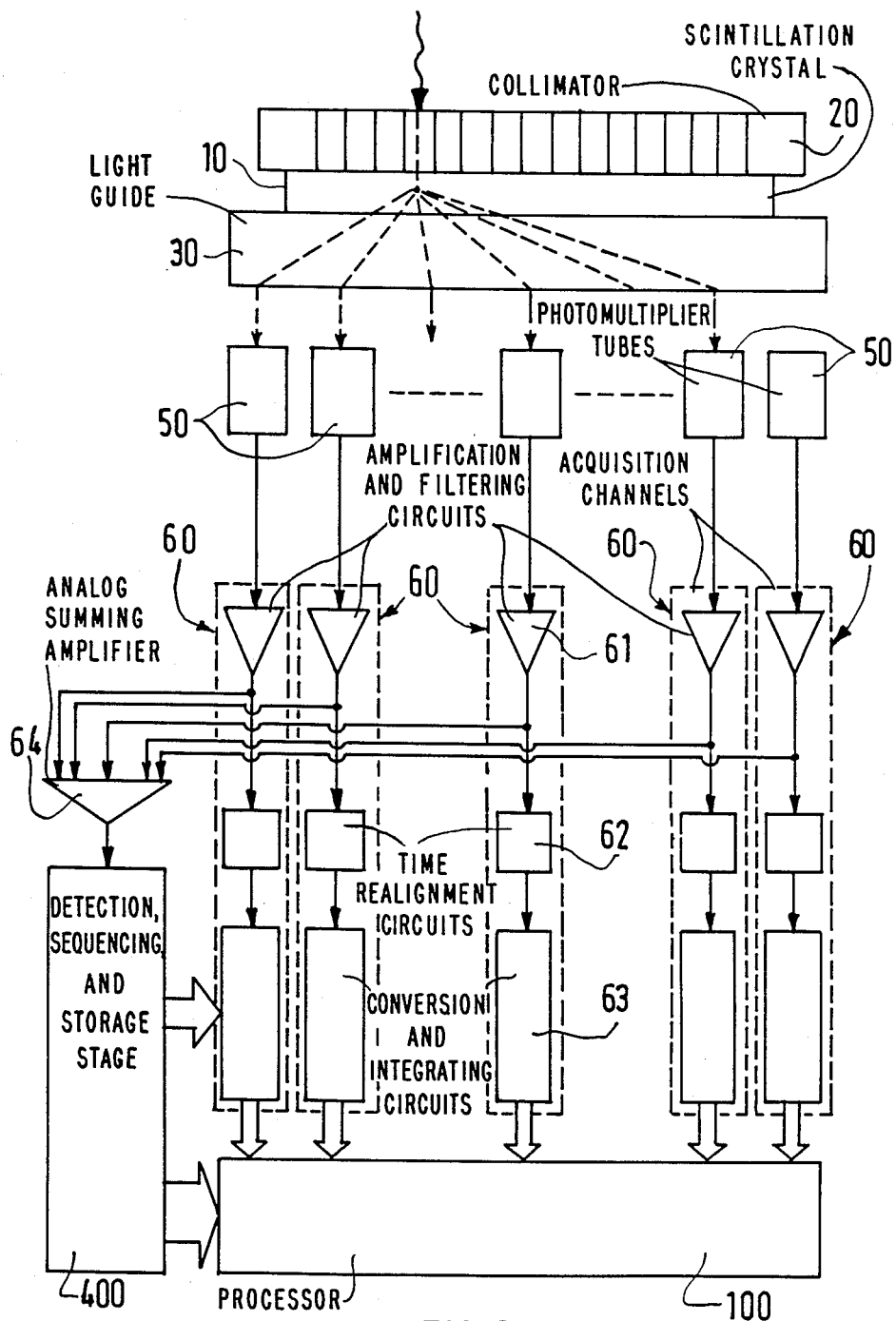

In the embodiment which will be described in detail hereinafter with reference to FIG. 3 which shows the modifications to the circuit diagram of FIG. 2 for a camera in accordance with the invention, the p acquisition channels 60 are no longer fully analog like in the described conventional camera. These channels now apply p digital signals $M_{i,j}$ (i=index varying from 1 to p) to the input of the processor 100 and now successively provide the amplification, filtering and sampling of the output signals of the photomultiplier tubes 50 after the A/D conversion of the samples obtained and the summing of these digital samples. The value of the p digital signals is related to that of the output current of the tubes 50 and hence to a fraction of the intensity of the initial scintillation, but differs in accordance with the pile-up rate of the scintillations (this fraction itself is related to the realization of the optical block and notably to the distance between the scintillation point and the axis of the tubes). It there was no pile-up, the value of each of these signals would be denoted as $S_{i,j}$; the estimation of these values in the presence of pile-up will be denoted as $\hat{S}_{i,j}$.

For realizing the above functions, each of the p channels comprises a series connection of an amplification and filtering circuit 61 which receives the output signal of the corresponding tube 50, a time realignment circuit 62 which is followed by a conversion and integration device 63 which successively provides the sampling of the output signals of the corresponding circuit 62, the A/D conversion of the samples obtained, and the summing thereof. There is also provided an analog summing amplifier 64 whose p inputs receive the p output signals of the amplification and filtering circuits 61 and whose output signal is applied to a pulse-start detector which is situated in the detection, sequencing and storage stage 400 to be described hereinafter.

The output signal of each of the p conversion and integration devices is applied to the processor 100, possibly via p FIFO memories which enable later operation at much lower frequencies by controlling the output of the scintillations. This array of FIFO memories actually enables a reduction of the speed of later calculations and the slower rhythm thus obtained may be practically equal to the mean arrival rhythm of the scintillations (for example, 2 microseconds for a mean rhythm of 500,000 scintillations per second) and no longer equal to the arbitrary arrival rhythm of the scintillations (approximately 0.2 microseconds in the former case). Each of the conversion and integration devices 63 used herein is equivalent to that disclosed in French Patent Application FR-A-No. 2,552,233 and the operations performed by these devices is controlled by the detection, sequencing and storage stage 400.

The processor 100 receives the p output signals of the acquisition channels and itself comprises various calculations devices for distinctly determining the coordinates $x_j$, $y_j$ and the energy $E_j$ of each scintillation j, for example by means of the relations (1) to (6) in the case of an arithmetical calculation device.

Figure 4:
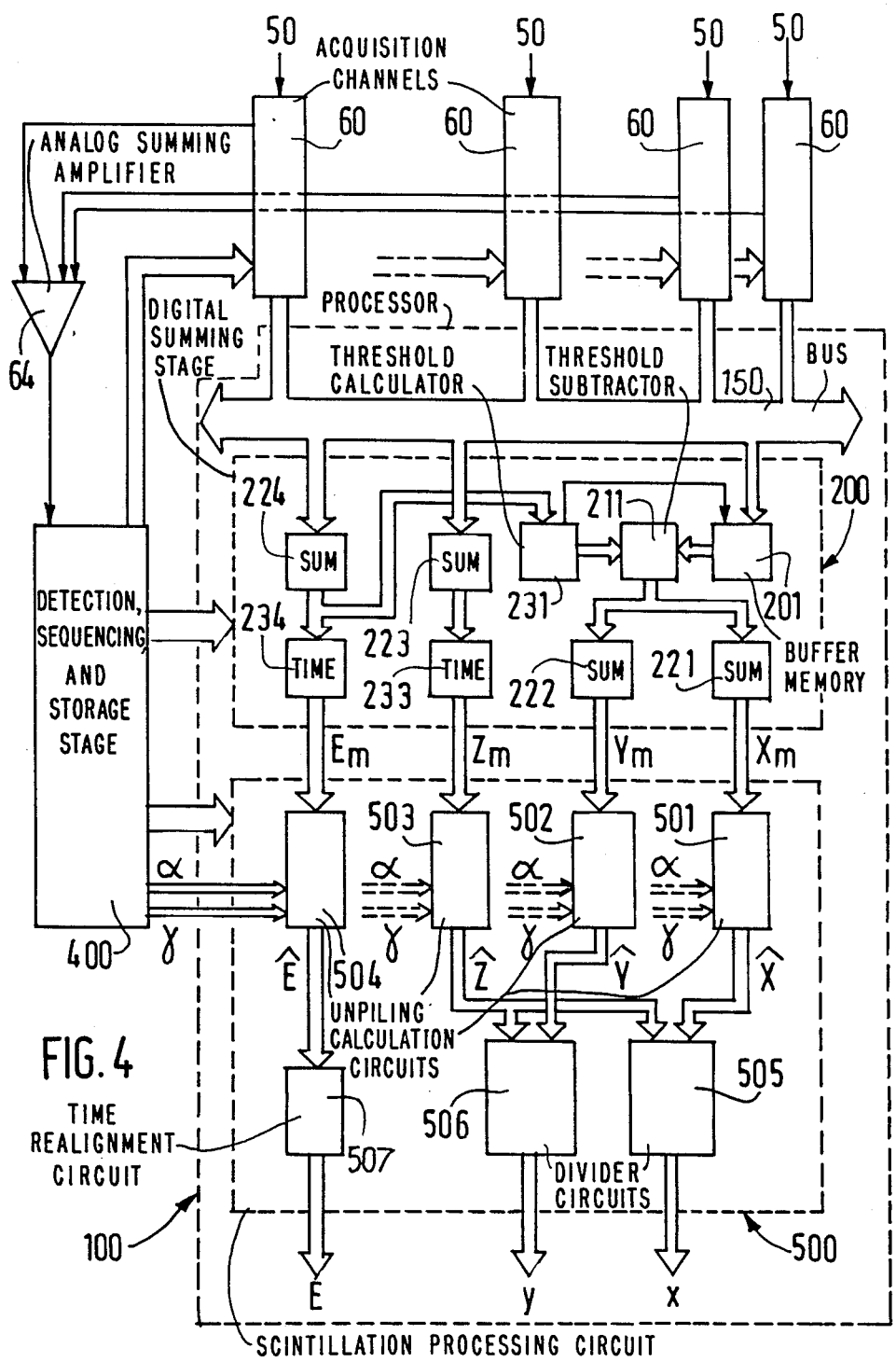
FIG. 4 shows a first embodiment of the processor of a scintillation camera in accordance with the invention.

More precisely, the processor 100 as shown in FIG. 4 is constructed as follows in the case of an arithmetical calculation as follows. It comprises first of all a bus 150 for transferring the digital signals $M_{i,j}$ present on the output of the p acquisition channels. For one of these channels, for example the channel i, there are shown the individual analog signals associated with several scintillations which are approximated in time (FIG. 1a) and the signal resulting from the pile-up of these individual signals (FIG. 1b), the scintillation j being disturbed upstream by several scintillations j-1, j-2, etc . . . If $\alpha_j$ and $\gamma_{k,j}$ are coefficients for the correction by extrapolation and interpolation, respectively, which can be determined on the basis of the known mean shape, as a function of time, of the pulse corresponding to a detected scintillation and on the basis of the measurement of the period $\theta_{j,j+1}$ between $t_{o,j}$ and $t_{o,j+1}$, if k is successively equal to j-1, j-2, . . . , j-q, and if the sigals $S_{i,k}$ represent for these respective values of k the values corrected for pile-up effects which would be supplied by the digital acquisition channel i in response to the scintillations j-1, j-2, ..., j-q, the digital signals obtained on the output of the acquisition channels will be:

$$M_{i,j} = \frac{S_{i,j}}{\alpha_j} + \sum_{k=j-1}^{k=j-q} \gamma_{k,j} S_{i,k} \quad (29)$$

where $M_{i,j}$ represents the value measured at the instant $t_{o,j+1}$, resulting from the summing of the samples during the time interval $\theta_{j,j+1}$ for the channel i.

The processor finally comprises a digital summing stage 200 which is connected to the output of the transfer bus 150. As appears from FIG. 4 which shows a first embodiment of the processor in accordance with the invention, the digital summing stage 200 comprises first of all two digital weighted sum forming devices 223 and 224 which form the following weighted sums:

$$Z_{m,j} = \sum_{i=1}^{i=p} J_i M_{ij} \quad (30)$$

$$E_{m,j} = \sum_{i=1}^{i=p} G_i M_{ij} \quad (31)$$

The quantity $E_{m,j}$ is used by a threshold calculation device 231 which may be a device for multiplying this quantity by the factor $f_o$ (experimentally determined and stored) and which presents the dependent threshold value $m_{oj}$ on its output.

The stage 200 also comprises a buffer memory 201 which receives the p output signals of the transfer bus 150 and which serves to delay these p signals in order to enable the operations of circuits 224 and 231 to be performed. The reading of the memory 201 is controlled, as indicated in FIG. 4, by the threshold calculation device 231; the output signal of the memory 201 is thus applied to a threshold subtraction circuit 211 which receives, on a first input, the p signals $M_{ij}$ delayed by the buffer memory 201 and, on a second input, the dependent threshold value $m_{oj}$. The output signals of this subtractor are the signals $M_{ij}-m_{oj}$.

The stage 200 finally comprises two other digital weighted sum forming devices 221 and 222 which form the following weighted sums respectively:

$$X_{m,j} = \sum_{i=1}^{i=p} K_i (M_{ij} - m_{oj}) \tag{32}$$

$$Y_{m,j} = \sum_{i=1}^{i=p} H_i (M_{ij} - m_{oj}) \tag{33}$$

Each of the four digital weighted sum forming devices is, for example, a multiplier-accumulator TDC 1009 (marketed by TRW, La Jolla, CA 92038, USA), one of the inputs of which receives the corresponding output signal $M_{ij}$ or $M_{ij}-m_{oj}$, its other input receiving the weighting coefficients in digital form which are stored in an auxiliary memory. When this type of multiplier-accumulator is effectively used, the auxiliary memory must be synchronized with the operation of the complete processor and may be incorporated, for example in the detection, sequencing and storage stage 400 to be described hereinafter.

The output signals $X_{mj}$, $Y_{mj}$, $Z_{mj}$, $E_{mj}$ which are available on the output of the digital summing stage 200 and which originate from the four digital weighted sum forming devices 221 to 224, either directly for the first two signals or via time realignment circuits 233 and 234 for the other two signals, are applied to a scintillation processing stage 500. As appears from FIG. 4, the stage 500 comprises four unpiling calculation circuits 501 to 504, two dividers 505 and 506 and one time realignment circuit 507. Because the four circuits 501 to 504 are identical, only one thereof will be described, for example the circuit 501.

Figure 5:
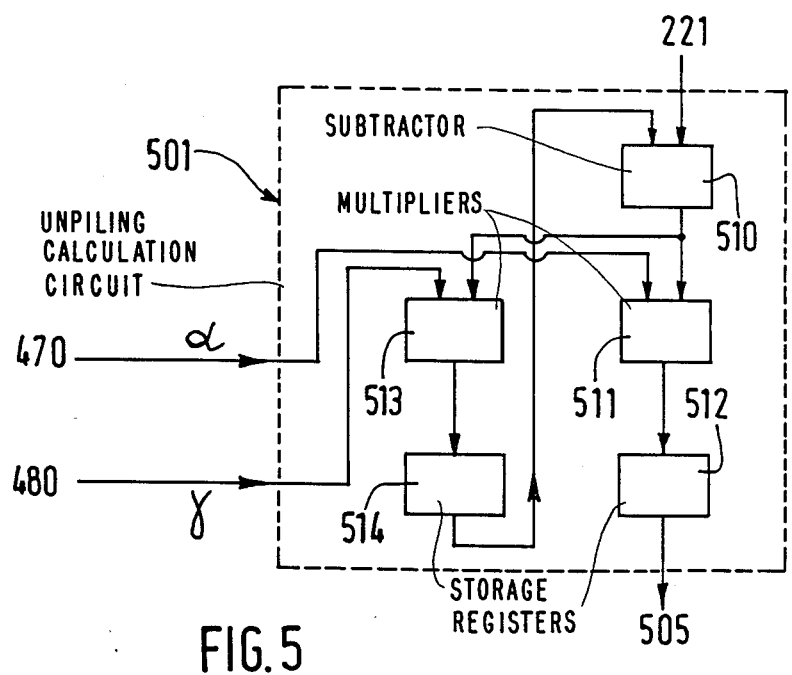
FIG. 5 shows an embodiment of one of the unpiling calculation circuits of the scintillation processing stage.

This circuit is shown in FIG. 5 and comprises a subtractor 510 whose first, positive input receives the output signal of the corresponding digital weighted sum forming device 221 (the circuits 501 to 504 correspond to the devices 201 to 204, respectively). The subtractor 510 is followed by a first multiplier 511 and a storage register 512, the output of which is that of the circuit 501. The subtractor 510 is also followed, connected parallel to the elements 511 and 512, by a second multiplier 513 and a second storage register 514. These multipliers may be replaced by a single multiplier circuit in association with a time multiplexer/demultiplexer. The negative input of the subtractor 510 is connected to the output of the storage register 514. The second input of the multiplier 511 is connected to the output of a memory 470 which stores the coefficient $\alpha_j$ and that of the multiplier 513 is connected to the output of a memory 480 which stores the coefficient $\gamma_{j,k}$. For the scintillation j the output signals $\hat{X}$, $\hat{Y}$, $\hat{Z}$, $\hat{E}$ of the four unpiling calculation circuits 501 to 504 are given by the expressions:

$$X_j = \alpha_j \left[ X_{m,j} - \sum_{k=j-l}^{k=j-q} \gamma_{k,j} X_k \right] \tag{34}$$

$$Y_j = \alpha_j \left[ Y_{m,j} - \sum_{k=j-l}^{k=j-q} \gamma_{k,j} Y_k \right] \tag{35}$$

$$Z_j = \alpha_j \left[ Z_{m,j} - \sum_{k=j-l}^{k=j-q} \gamma_{k,j} Z_k \right] \tag{36}$$

$$E_j = \alpha_j \left[ E_{m,j} - \sum_{k=j-l}^{k=j-q} \gamma_{k,j} E_k \right] \tag{37}$$

The elements of each circuit 501 to 504, for example the elements 510 to 514 of the circuit 501, form an unpiling calculation circuit which is equivalent to that described in French Patent Application FR-A-No. 2,552,233 and denoted by the reference numerals 120 to 160. The other three circuits 502 o 504 comprise the same elements as the circuit 501.

The output signal $\hat{X}$ of the unpiling calculation circuit 501 is applied to the first input of the divider 505 and the output signal $\hat{Y}$ of the circuit 502 is applied to the first input of the divider 506. The second input signal of each of these dividers is formed by the output signal $\hat{Z}$ of the unpiling calculation circuit 503. The three output signals of the processing stage, also being those of the processor, are formed by the output signal $x_j=X_j/Z_j$ of the divider 505, the output signal $x_j=Y_j/Z_j$ of the divider 506, and the output signal $E_j$ of the time realignment circuit 507 connected to the output of the unpiling calculation circuit 504.

Figure 6:
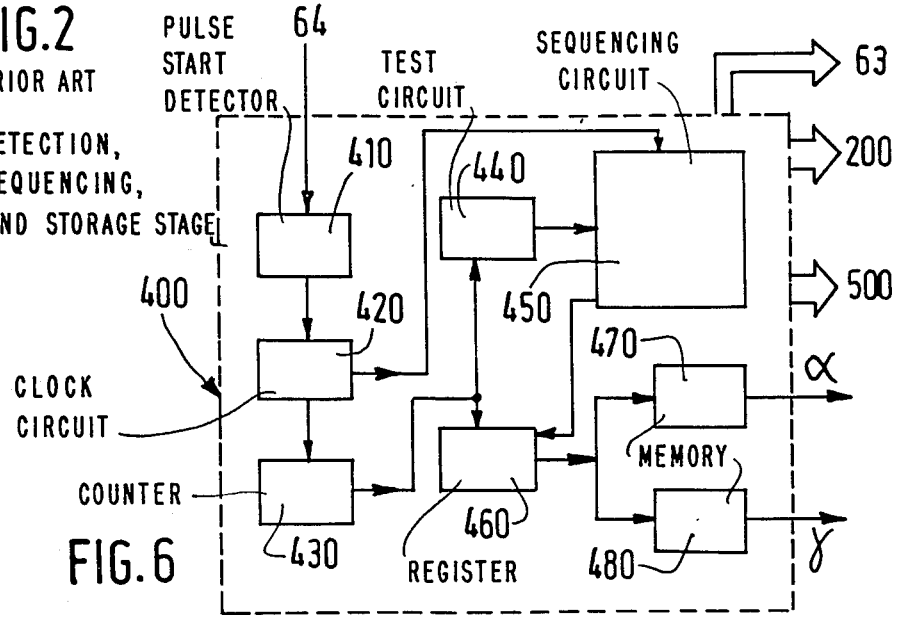
FIG. 6 shows an embodiment of the detection, sequencing and storage stage.

In the processor the detection, sequencing and storage stage 400 is also associated with these elements. The stage 400 is shown in FIG. 6 and comprises first of all a pulse-start detector 410 which receives the output signal of the analog summing amplifier 64 (see the figures 3 and 4). The detector 410 is fillowed by a clock circuit 420 which generates periodic signals for controlling a sequencing circuit 450 as well as a counter 430 for these clock signals. The number thus counted is applied to a test circuit 440 whose output signal is applied to the sequencing circuit 450. The latter circuit synchronizes the operations performed in the acquisition channels, the stage 200 and the stage 500, and validates the contents of a register 460 for storing the output signal of the counter 430, the register 460 being connected parallel to the test circuit 440. To the output of the register 460 there are connected the two memories 470 and 480 (mentioned above with reference to FIG. 5) which store the coefficients $\alpha_j$ and $\gamma_{j,k}$ respectively. The above elements 410 to 480 form a detection, sequencing and storage stage which is similar to that disclosed in the Application FR-A-No. 2,582,233.

In the first embodiment described above, the construction of the processor enables the exact weighted sums $X_j$, $Y_j$, $Z_j$ to be deduced on the one hand from the calculated values $X_{m,j}$, $Y_{m,j}$, $Z_{m,j}$ and on the other hand from the coefficients $\alpha_j$ and $\gamma_{k,j}$, utilizing the formulas (34) to (37).

Figure 8:
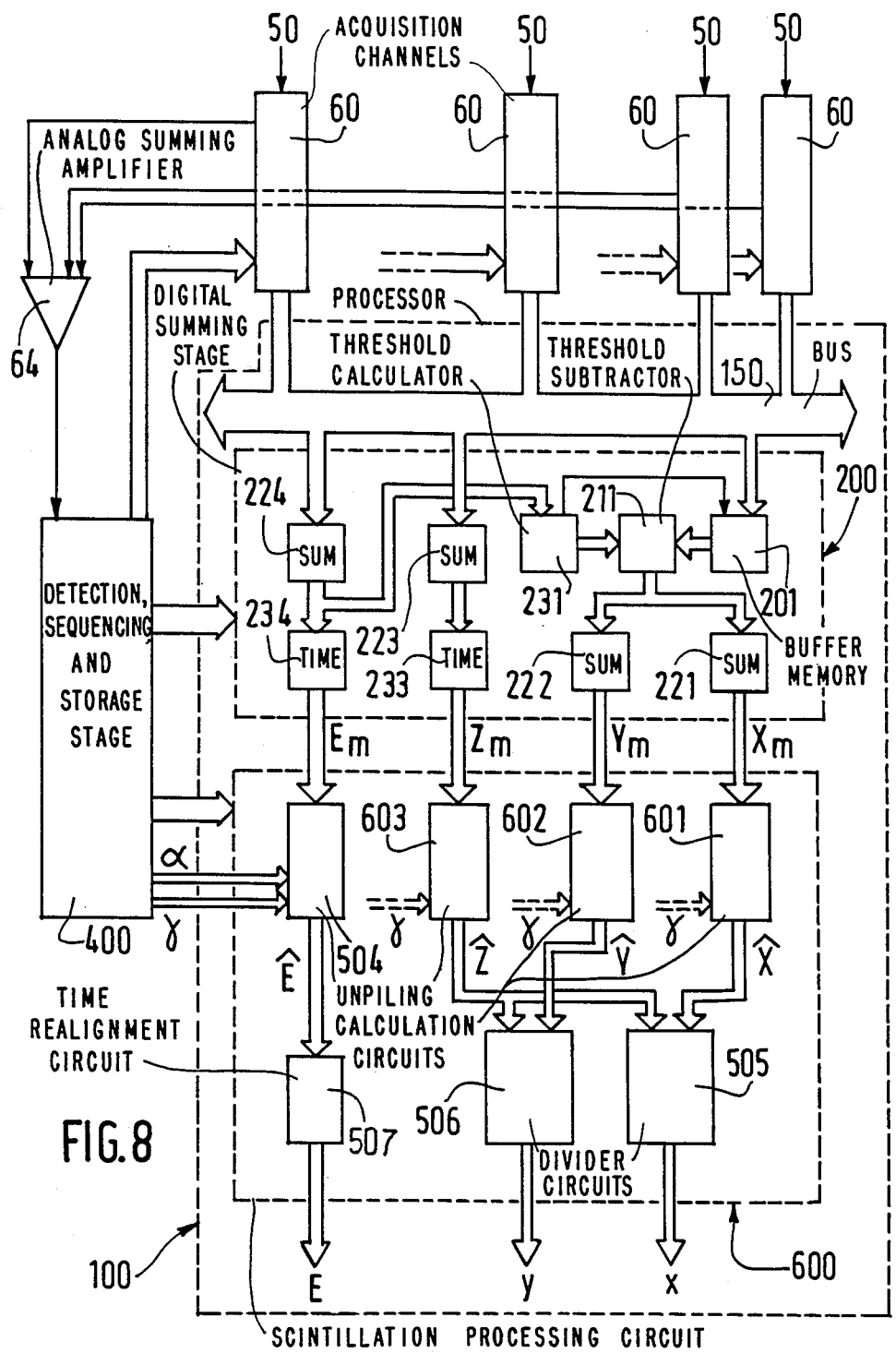
FIG. 8 shows a second embodiment of the processor of a scintillation camera in accordance with the invention, which includes the embodiment of the unpiling calculation circuit shown in FIG. 7.

In a second embodiment of the processor which is shown in FIG. 8, the calculation of the scintillation coordinates can be realized, without introducing extrapolation, in accordance with the following expressions:

$$X'_j = X_{m,j} - \sum_{k=j-l}^{k=j-q} \gamma_{k,j} X'_k \tag{38}$$

$$Y'_j = Y_{m,j} - \sum_{k=j-l}^{k=j-q} \gamma_{k,j} Y'_k \tag{39}$$

$$Z_j = X_{m,j} - \sum_{k=j-l}^{k=j-q} \gamma_{k,j} \hat{Z}_k \quad (40)$$

where always $x_j = \hat{X}'_j/\hat{Z}'_j$ and $y_j = \hat{Y}'_j/\hat{Z}'_j$. In this embodiment, the scintillation processing stage is denoted by the reference numeral 600 and the three unpiling calculation circuits which receive the signals $X_m$, $Y_m$, $Z_m$ have been modified in comparison with FIG. 5 in that the multiplier 511 has been omitted.

Figure 7:
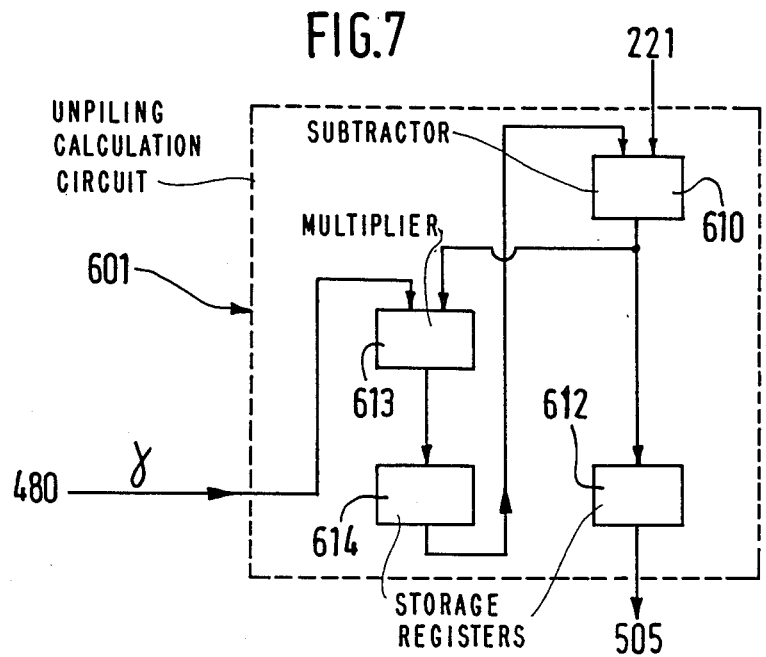
FIG. 7 shows an alternative embodiment of the unpiling calculation circuits shown in FIG. 5.

These three circuits actually have the construction shown in FIG. 7 for an arbitrary one of these circuits, for example the first one of the circuits 601 to 603. The circuit 601 comprises a subtractor 610 whose first input receives the output signal of the corresponding digital weighted sum forming device 221. The subtractor 610 is followed on the one hand directly by a storage register 612 whose output is that of the unpiling calculation circuit as previously, and on the other hand, in parallel, by a multiplier 613, followed by a storage register 614. The output signal of the register 614 is applied to the second input of the subtractor 610, the other input of the multiplier 613 being connected to the output of the memory 480 included in the stage 400 for storing the coefficient $\gamma$.

The other two circuits 602 and 603 comprise similar elements. The unpiling calculation circuit 504 remaining the same, the construction of the processor 100 is now as shown in FIG. 8. As before, the energy E is available on the output of the time realignment circuit 507.

In the second embodiment described above, the construction of the processor enables the procedure to start with the determination of the weighted sums without extrapolation, followed by calculation of the coordinates as before. In a third embodiment, another version of the processor is proposed in which first the coordinates $x_{mj}$, $y_{mj}$, referred to as measured coordinates, are determined which contain errors due to the piling-up of scintillations:

$$x_{mj} = X_{m,j}/Z_{m,j} \quad (41)$$

$$y_{mj} = Y_{m,j}/Z_{m,j} \quad (42)$$

This determination is succeeded by the calculation of the exact coordinates of the scintillation j by means of the following expressions:

$$x_j = x_{mj} - \sum_{k=j-l}^{k=j-q} \Gamma_{kj}(x_k - x_{mj}) \quad (43)$$

$$y_j = y_{mj} - \sum_{k=j-l}^{k=j-q} \Gamma_{kj}(y_k - y_{mj}) \quad (44)$$

Figure 9:
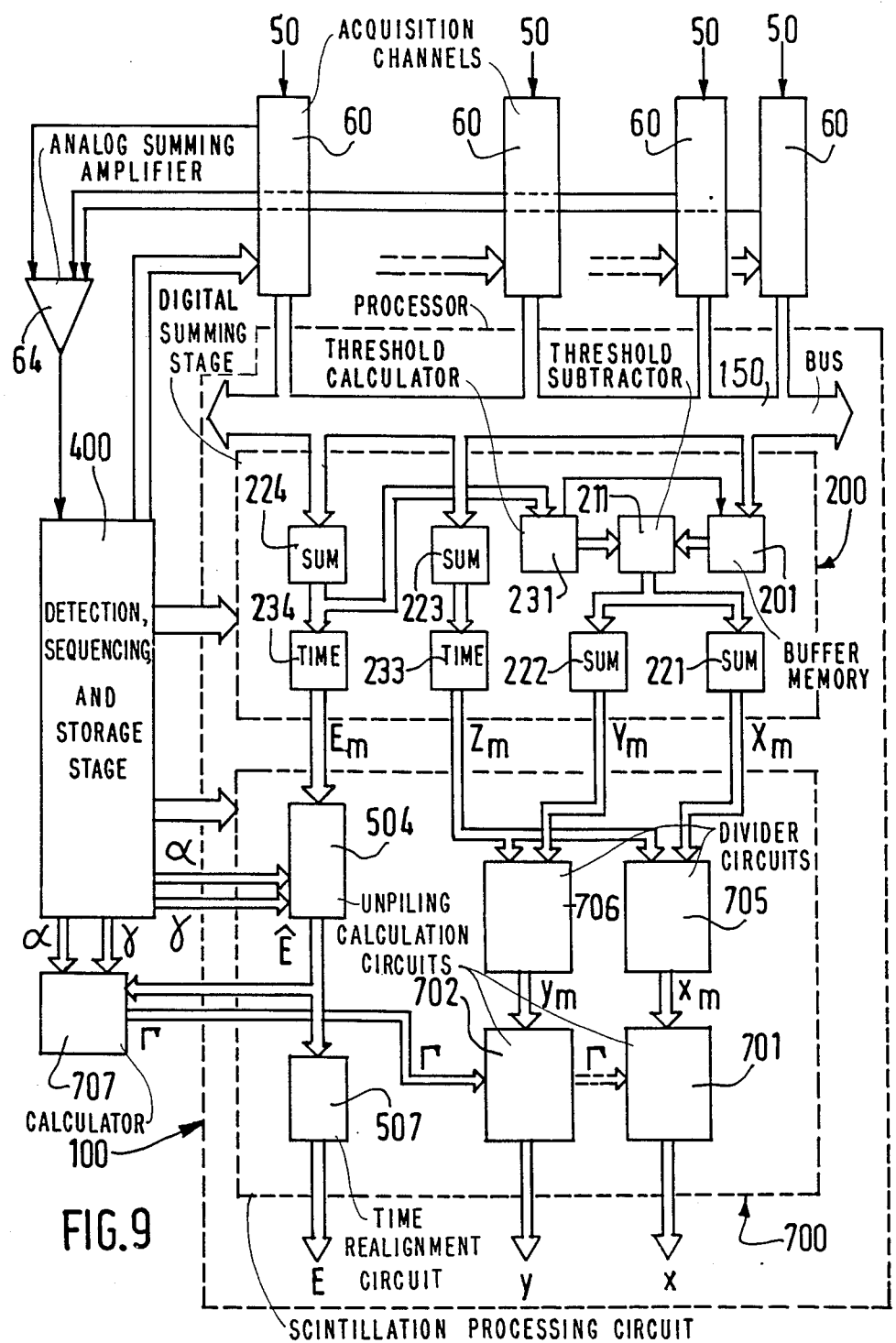
FIG. 9 shows a third embodiment of the processor of a scintillation camera in accordance with the invention, which includes a third embodiment of the scintillation processing stage.

More precisely, in this third embodiment in accordance with the invention, shown in FIG. 9, the processor 100 comprises a third type of scintillation processing stage which is denoted by the reference numeral 700. In this alternative embodiment, the unpiling operation is no longer performed on the output signals $X_m$, $Y_m$, $Z_m$ of the digital summing stage 200 but rather on the coordinates $x_{mj}$ and $y_{mj}$ obtained on the output of two dividers 705 and 706. The divider 705 receives the output signals $X_m$ and $Z_m$ of the digital summing stage 200, and the divider 706 receives the signals $Y_m$ and $Z_m$. The coordinates $x_j$, $y_j$ corresponding to the scintillation j are thus obtained on the output of the unpiling calculation circuits 701 and 702 on the basis of on the one hand the measured coordinates and on the other hand on the basis of the already known coordinates $x_k$, $y_k$ of the preceding scintillations, disturbing the scintillation j, in accordance with the expressions (43) and (44).

The coefficients $\Gamma_{k,j}$ being functions of the measured time intervals $\theta_{j,j+1}$, $\theta_{k,j}$ and the ratios $\hat{E}_k/\hat{E}_j$, are calculated in an additional calculation circuit 707 which receives on the one hand the output signal E of the unpiling calculation circuit 504 (always included in the processing stage) and on the other hand the coefficients $\alpha$ and $\gamma$ supplied by the detection, sequencing and storage stage 400. In the present embodiment, the circuit 707 calculates on the one hand, based on the values of E successively received, the successive ratios $\hat{E}_k/\hat{E}_j$ and, on the other hand the products $\alpha_j$, $\gamma_{k,j}$ on the basis of which the coefficients $\Gamma_{k,j}$ are evaluated in accordance with the relation $\Gamma_{k,j} = \alpha_j \gamma_{k,j} \hat{E}_k/\hat{E}_j$. The coefficients $\Gamma_{kj}$ are applied to the unpiling calculation circuits 701 and 702 which have a configuration which is similar to that of the circuits 601 and 602. The energy E is again available on the output of the timer realignment circuit 507.

It is to be noted that the invention is not restricted to the embodiments described and shown, for which many alternatives are feasible without departing from the scope of the invention.

For example, in the three embodiments described the calculation of the threshold in the circuit 231 can be performed on the basis of the signal $Z_m$ instead of the signal $E_m$. The input connection of the threshold calculation device 231 is then no longer connected to the output of the device 224 but instead to that of the device 223. On the other hand, an amplitude rejection cricuit for reducing the number of scintillations to be processed may be provided, so that calculations are performed only on selected scintillations (by means of a threshold, an energy window, etc. . . . ).

On the other hand there may be provided a time multiplexer so that only one divider need be used instead of two in each of the embodiments shown in figures 4, 8 and 9. A time multiplex circuit may also be provided in order to reduce the number of unpiling calculation circuits, so that only one unpiling calculation circuit need be used instead of the four circuits 501 to 504 in the embodiment shown in FIG. 4, the four circuits 601 to 603 and 504 in the embodiment shown in FIG. 8, or the three circuits 701, 702 and 504 in the embodiment shown in FIG. 9. The series of alternatives proposed in this section can also be used for the other embodiments according to the FIGS. 10 to 15.

Taking into account that the means for the correction of linearity errors and energy errors which are utilized by state of the art cameras and which act on the signals x, y, E obtained on the output of the processor, Z or E can be used at random for the calculation of coordinates, in that case only one of these two quantities can be calculated and, depending on the choice made, the other quantity can be deduced from calculations in which the specific corrections for this choice are made and which are executed by those means.

Figure 10:
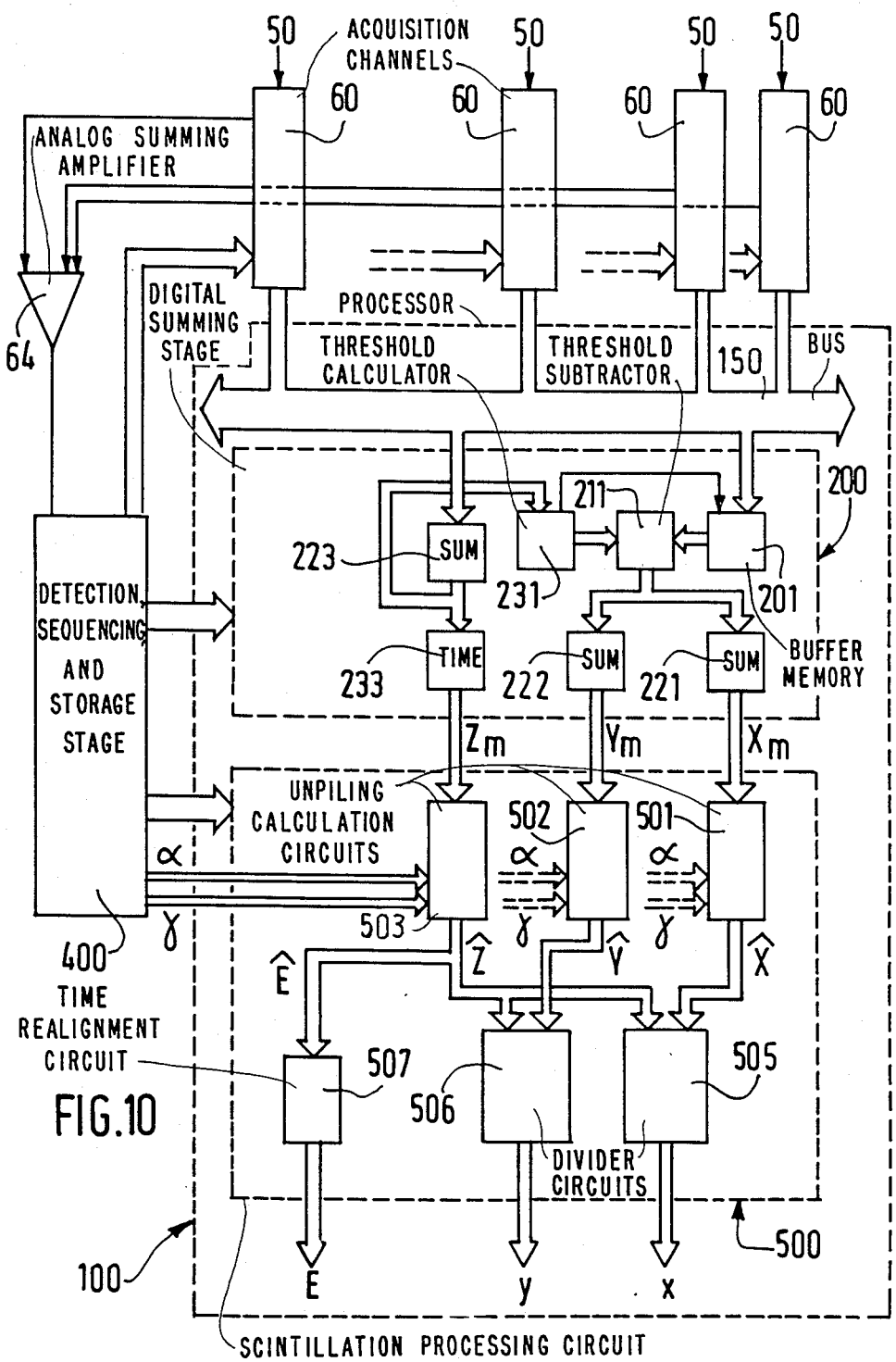
FIGS. 10 to 12 show, in correspondence with the FIGS. 4, 8 and 9, the modifications of the processor when only three calculation channels X, Y, Z are used.
Figure 11:
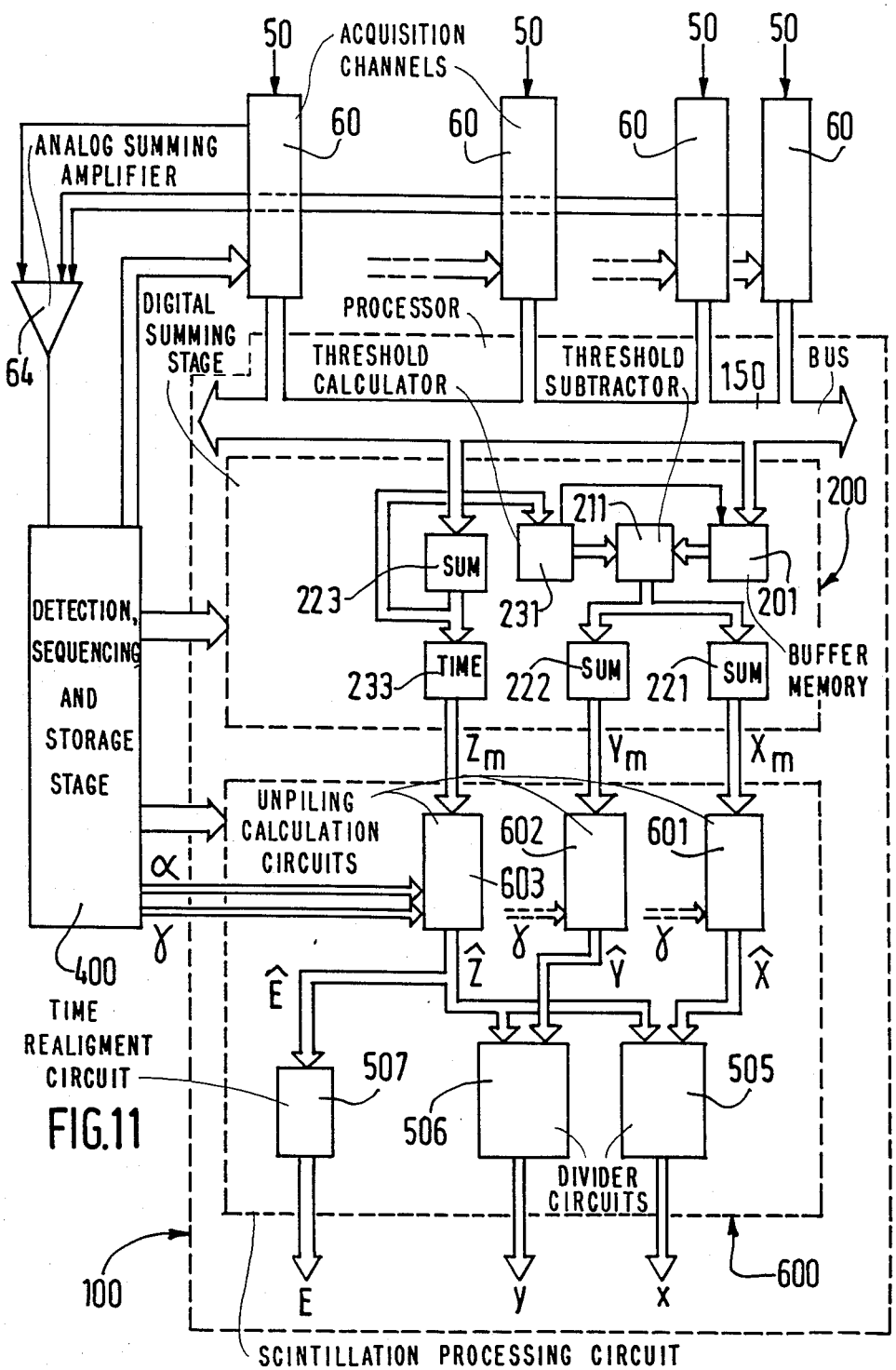
Figure 12:
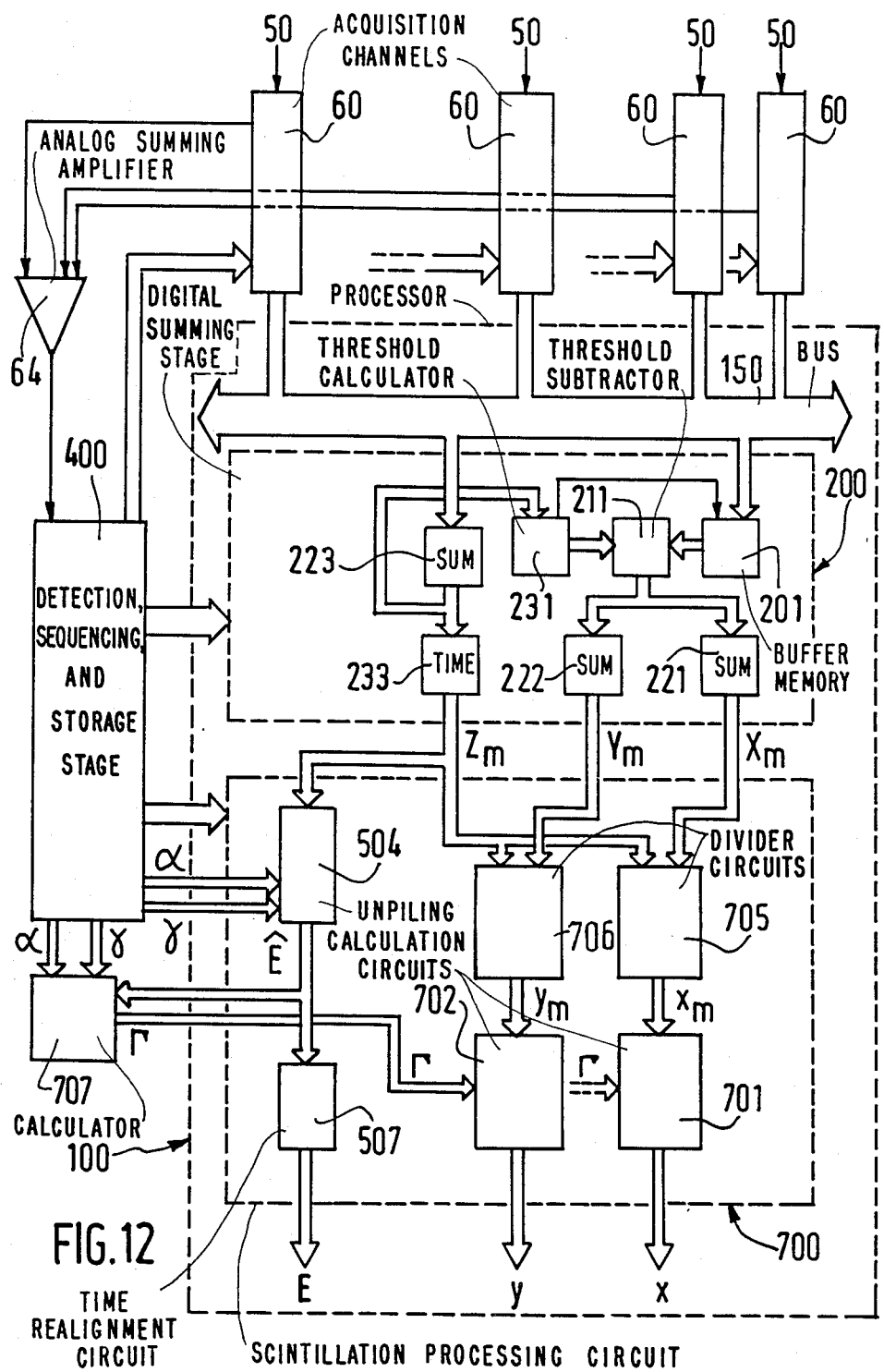
Figure 13:
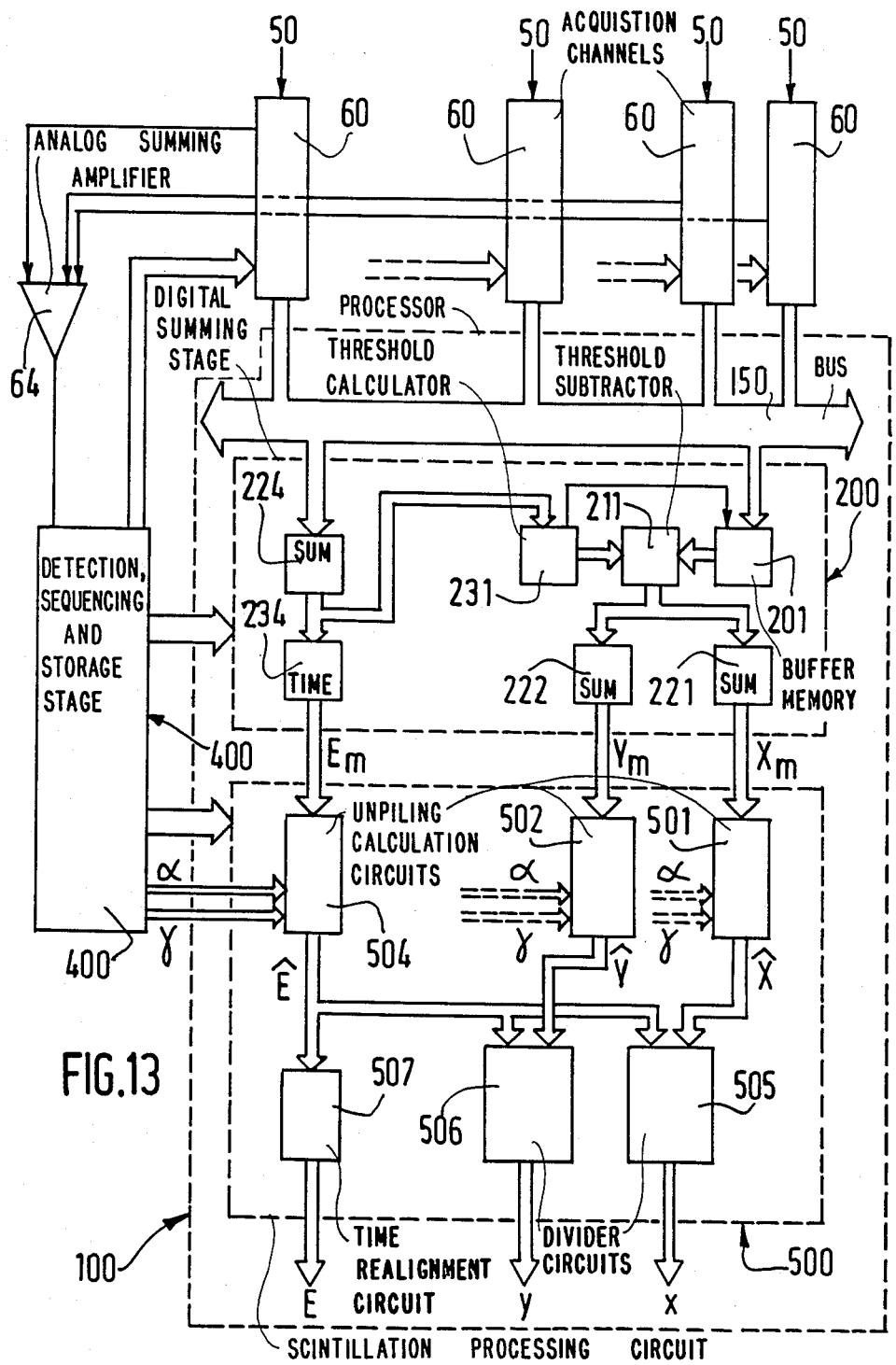
FIGS. 13 to 15 show, in correspondence with the FIGS. 4, 8 and 9, the modifications of the processor when only three calculation channels X, Y, E are used.
Figure 14:
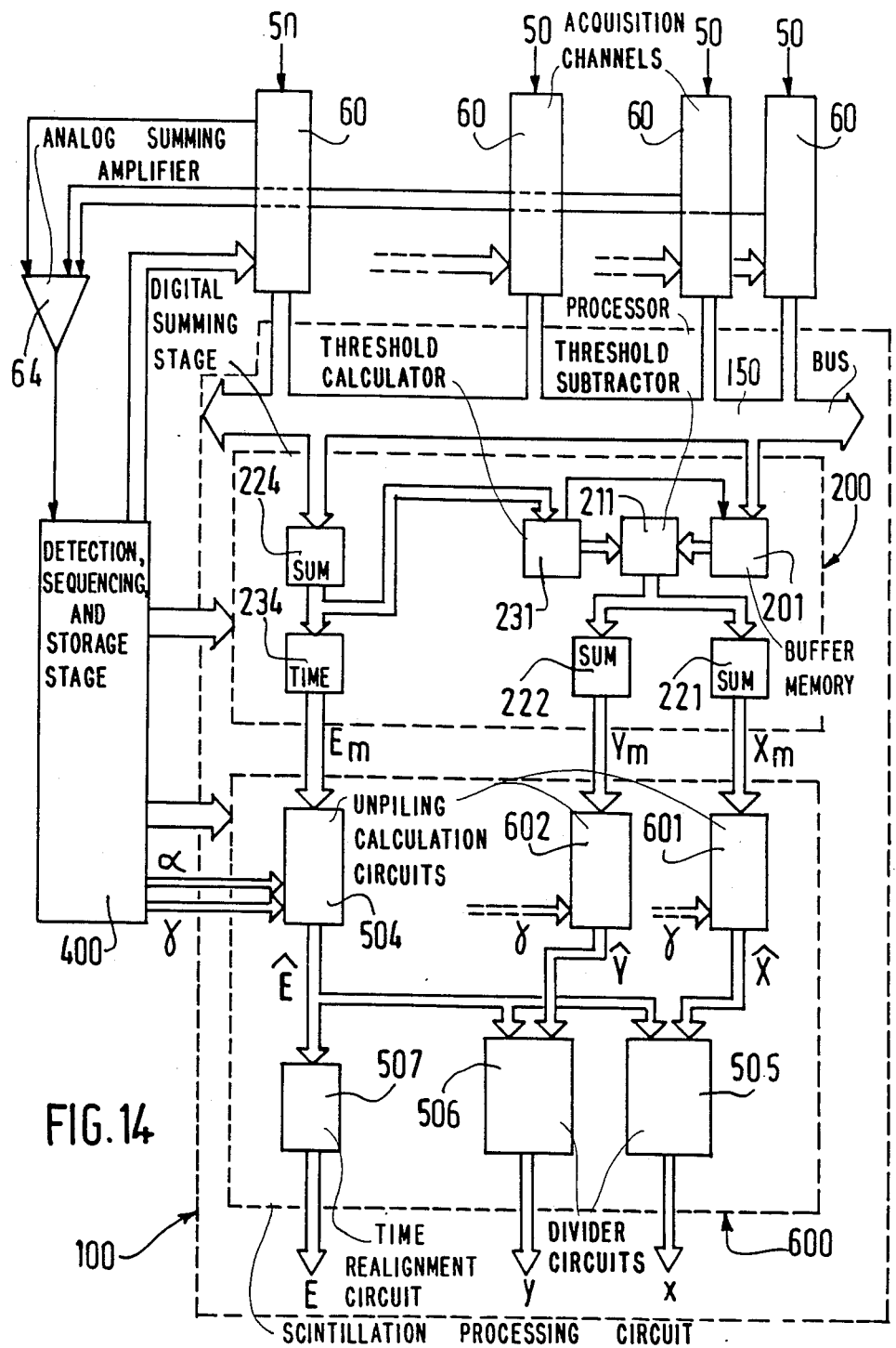
Figure 15:
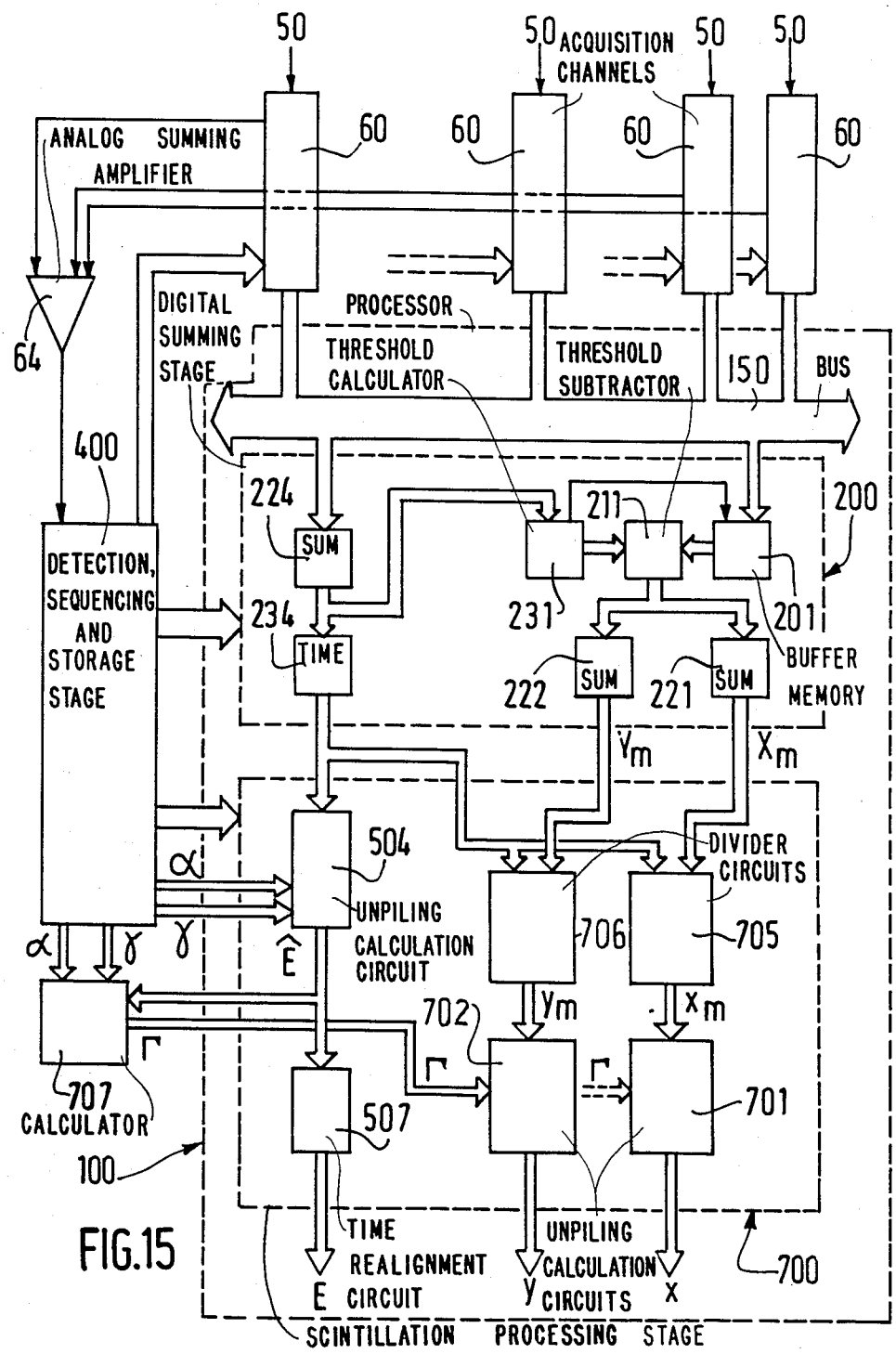

The digital summing stage 200 thus comprises only three weighted digital weighted sum forming devices which supply the signals $X_m$, $Y_m$, $Z_m$ or $X_m$, $Y_m$, $E_m$, respectively, and the scintillation processing stage also comprises only three unpiling calculation circuits. Similar to the FIGS. 4, 8, 9, the FIGS. 10 to 12 show the modifications of the processor when only three channels X, Y, Z are used, while the FIGS. 13 to 15 show (again similar to the FIGS. 4, 8, 9) the modifications of the processor when only three channels X, Y, E are used.

On the other hand, it is also to be noted that in order to enable operation at lower frequencies by controlling the scintillation rate, read/write FIFO memories which are controlled by the detection, sequencing and storage stage 400 can be arranged upstream from the digital summing stage.

Finally, it is to be noted that the bus 150 is either incorporated in the processor in which it forms the input or access element, or is connected thereto without being included therein.

What is claimed is:

1. A scintillation camera comprising a scintillation crystal for converting each photon received into a scintillation, a light guide for coupling said crystal to an entrance window of an array of p photodetectors serving to convert each scintillation into a current, p acquisition channels receiving output signals of said photodetectors and supplying characteristic electric signals relating to the intensity of the scintillation and to the distance between the respective scintillations and each of the photodetectors, and a processor for supplying the coordinates $x_j$ and $y_j$ of a scintillation j and its associated energy $E_j$, characterized in that:

(A) said p acquisition channel realize amplification, filtering and sampling of said output signals of said photodetectors, followed by A/D conversion of the samples obtained and their summing, and apply p digital signals to the input of said processor;

(B) said processor comprises:
  (a) a bus for transferring said p digital signals;
  (b) a digital summing stage comprising:
    (i) a buffer memory receiving a p output signal $M_{ij}$ of the transfer bus;
    (ii) a threshold subtraction circuit having a first input receiving said p signals, delayed by said buffer memory, and having a second input receiving a dependent threshold value $m_{oj}$, said subtraction circuit supplying p signals $M_{ij}-m_{oj}$ which assume the value O if $M_{ij}$ is smaller than $m_{oj}$;
    (iii) four digital weighted sum forming devices, the first two receiving the p signals $M_{ij}$-$m_{oj}$ supplied by said threshold subtraction circuit, and the other two directly receiving the p output signals $M_{ij}$ of said transfer bus; and
    (iv) a threshold calculation device receiving the output signal of the fourth digital weighted sum forming device in order to evaluate the dependent threshold $m_{oj}$ according to a proportionality relation with the value $E_{mj}$ associated with each scintillation j, said digital summing stage supplying the following signals $X_{m,j}$, $Y_{m,j}$, $Z_{m,j}$, $E_{m,j}$ ($K_i$, $H_i$, $J_i$, $G_i$ being weighted coefficients):

$$X_{m,j} = \sum_{i=1}^{i=p} K_i(M_{ij}-m_{oj})$$

$$Y_{m,j} = \sum_{i=1}^{i=p} H_i(M_{ij}-m_{oj})$$

$$Z_{m,j} = \sum_{i=1}^{i=p} J_i M_{ij}$$

-continued $$E_{m,j} = \sum_{i=1}^{i=p} G_i M_{ij}$$

either directly on the output of the first two digital weighted sum forming devices for the first two of these signals or by two time realignment circuits connected to the output of the other two devices for the last two of these signals; and (c) a scintillation processing storage including unpiling calculation circuits and two dividers, said processing stage supplying on the basis of the signals $X_{m,j}$, $Y_{m,j}$, $Z_{m,j}$, $E_{m,j}$ three coordinate and energy signals $x_j$, $y_j$, $E_j$, relating to the scintillation j; and (C) a detection, sequencing and storage stage is provided in order to supply various clock signals for synchronizing the elements of the p acquisition channels and the elements of said processor, and correction coefficients for said scintillation processing stage, said detection, sequencing and storage stage receiving a signal corresponding to the sum of the p output signals of said photodetectors.

2. A scintillation camera as claimed in claim 1, characterized in that the scintillation processing stage comprises four unpiling calculation circuits which receive the digital signals $X_{mj}$, $Y_{mj}$, $Z_{mj}$, $E_{mj}$, respectively, for each scintillation j and which supply four signals $\hat{x}_j$, $\hat{Y}_j$, $\hat{Z}_j$, $\hat{E}_j$, and two dividers which supply two signals $x_j=\hat{X}_j/\hat{Z}_j$ and $y_j=\hat{Y}_j/\hat{Z}_j$, respectively, the three signals $x_j$, $y_j$, $E_j$ being formed by the output signals of the first divider, the second divider and a time realignment circuit, respectively, which receives the output signal of the fourth unpiling calculation circuit, the correction coefficients being coefficients for correction by extrapolation and interpolation ($\alpha$ and $\gamma$, respectively) for the four unpiling calculation circuits.

3. A scintillation camera as claimed in claim 2, characterized in that each of the four unpiling calculation circuits compises a subtractor having a first input receiving the corresponding output signal of the digital summing stage, said subtractor being followed by a first multiplier and a first storage register, and by a second multiplier and a second storage register connected in parallel to said first multiplier and said first storage register, the output of said second register being connected to the second input of said subtractor, the second input of said first multiplier being connected to the output of a memory for storing the coefficient $\alpha$, and the second input of the second multiplier is connected to the output of said memory for storing the coefficient $\gamma$.

4. A scintillation camera as claimed in claim 3, characterized in that said multipliers are replaced by a single multiplier circuit which is associated with a time multiplexer/demultiplexer.

5. A scintillation camera as claimed in claim 2, characterized in that each of the first three unpiling calculation circuits comprises a subtractor having a first input receiving the corresponding output signal of the summing stage, followed by a third storage register having an output of said unpiling calculation circuit and followed, in parallel, by a third multiplier, a fourth storage register having an output connected to the second input of said subtractor, and the other input of the third multiplier being connected to the output of a memory for storing the coefficient $\gamma$.

6. A scintillation camera as claimed in claim 1, characterized in that the scintillation processing stage comprises three unpiling calculation circuits, two dividers, a time realignment circuit, and an additional calculation circuit, the two dividers receiving the signals $X_{mj}$, $Y_{mj}$, $Z_{mj}$ in order to supply two signals $x_{mj}=X_{mj}/Z_{mj}$ and $y_{mj}=Y_{mj}/Z_{mj}$, the first and the second unpiling calculation circuits receiving said signals $x_{mj}$, $y_{mj}$ and supplying the signals $x_j$, $y_j$, the third unpiling calculation circuit receiving the signal $E_{mj}$ and supplying the signal $\bar{E}$, the additional calculation circuit receiving said signal $\bar{E}$ and said correction coefficients in order to supply the first and the second unpiling calculation circuit with an additional correction coefficient $\Gamma$.

7. A scintillation camera comprising a scintillation crystal for converting each photon received into a scintillation, a light guide for coupling said crystal to an entrance window of an array of p photodetectors serving to convert each scintillation into a current, p acquisition channels receiving output signals of said photodetectors and supplying p characteristic electric signals relating to the intensity of the scintillation and to the distance between the respective scintillations and each of said photodetectors, and a processor for supplying the coordinates $x_j$ and $y_j$ of a scintillation j and its associated energy $E_j$, characterized in that:
 (A) said p acquisition channels realize amplification, filtering and sampling of said output signals of said photodetectors, followed by A/D conversion of the samples obtained and their summing, and apply p digital signals to the input of said processor;
 (B) said processor comprises:
  (a) a bus for transferring said p digital signals;
  (b) a digital summing stage comprising:
   (i) a buffer memory receiving p output signals $M_{ij}$ of the transfer bus;
   (ii) a threshold subtraction circuit having a first input receiving said p signals, delayed by said buffer memory, and having a second input receiving a dependent threshold value $m_{oj}$, said subtraction circuit supplying p signals $M_{ij}-m_{oj}$ which assume the value O if $M_{ij}$ is smaller than $m_{oj}$;
   (iii) three digital weighted sum forming devices, the first two receiving the p signals $M_{ij}-m_{oj}$ supplied by said threshold subtraction circuit, and the last device directly receiving the p output signals $M_{ij}$ of said transfer bus; and
   (iv) a threshold calculation device receiving the output signal of said last weighted sum forming device in order to evaluate the dependent threshold $m_{oj}$ according to a proportionality relation with the value $E_{mj}$ associated with each scintillation j, said digital summing stage supplying the following signals $X_{m,j}$, $Y_{m,j}$, $Z_{m,j}$ ($K_i$, $H_i$, $J_i$, being weighted coefficients):

$$X_{m,j} = \sum_{i=1}^{i=p} K_i (M_{ij} - m_{oj})$$

$$Y_{m,j} = \sum_{i=1}^{i=p} H_i (M_{ij} - m_{oj})$$

$$Z_{m,j} = \sum_{i=1}^{i=p} J_i M_{ij}$$

either directly on the output of the first and the second digital weighted sum forming device for the first two of these signals or by a time realignment circuit connected to the output of the last device for the last one of these signals, and
 (c) a scintillation processing stage including unpiling calculation circuits and two dividers, said processing stage supplying on the basis of the signals $X_{mj}$, $Y_{mj}$, $Z_{mj}$ three coordinate and energy signals $x_j$, $y_j$, $E_j$ relating to the scintillation j, and
 (C) a detection, sequencing and storage stage is provided in order to supply various clock signals for synchronizing the elements of the p acquisition channels and the elements of said processor, and correction coefficients for said scintillation processing stage, said detection, sequencing and storage stage receiving a signal corresponding to the sum of the p output signals of said photodetectors.

8. A scintillation camera comprising a scintillation crystal for converting each photon received into a scintillation, a light guide for coupling said crystal to an entrance window of an array of p photodetectors serving to convert each scintillation into a current, p acquisition channels receiving output signals of said photodetectors and supplying p characteristic electric signals relating to the intensity of the scintillation and to the distance between the respective scintillation and each of said photodetectors, and a processor for supplying the coordinates $x_j$ and $y_j$ of a scintillation j and its associated energy $E_j$, characterized in that
 (A) said p acquisition channels realize amplification, filtering and sampling of said output signals of said photodetectors, followed by A/D conversion of the samples obtained and their summing, and apply p digital signals to the input of the processor;
 (B) said processor comprises:
  (a) a bus for transferring said p digital signals;
  (b) a digital summing stage comprising:
   (i) a buffer memory receiving p output signals $M_{ij}$ of the transfer bus;
   (ii) a threshold subtraction circuit having a first input receiving said p signals, delayed by said buffer memory, and having a second input receiving a dependent threshold value $m_{oj}$, said subtraction circuit supplying p signals $M_{ij}-m_{oj}$ which assume the value O if $M_{ij}$ is smaller than $m_{oj}$;
   (iii) three digital weighted sum forming devices, the first two receiving the p signals $M_{ij}-m_{oj}$ supplied by said threshold subtraction circuit, and the last one directly receiving the p output signals $M_{ij}$ of said transfer bus; and
   (iv) a threshold calculation device receiving the output signal of said last digital weighted sum forming device in order to evaluate the dependent threshold $m_{oj}$ according to a proportionality relation with the value $E_{mj}$ associated with each scintillation j, said digital summing stage supplying the following signals $X_{m,j}$, $Y_{m,j}$, $E_{m,j}$ ($K_i$, $H_i$, $G_i$, being weighted coefficients):

$$X_{m,j} = \sum_{i=1}^{i=p} K_i (M_{ij} - m_{oj})$$

$$Y_{m,j} = \sum_{i=1}^{i=p} H_i (M_{ij} - m_{oj})$$

-continued $$E_{m,j} = \sum_{i=1}^{i=p} J_i M_{ij}$$

either directly on the output of the first and the second digital weighted sum forming device for the first two of these signals or by a time realignment circuit connected to the output of the last device for the last one of these signals; and (c) a scintillation processing stage including unpiling calculation circuits and two dividers, said processing stage supplying on the basis of the signals $X_{mj}$, $Y_{mj}$, $E_{mj}$ three coordinate and energy signals $x_j$, $y_j$, $E_j$ relating to the scintillation j; and (C) a detection, sequencing and storage stage is provided in order to supply various clock signals for synchronizing the elements of the p acquisition channels and the elements of said processor, and correction coefficients for said scintillation processing stage, said detection, squencing and storage stage receiving a signal corresponding to the sum of the p output signals of said photodetectors.

9. A scintillation camera as claimed in claim 7 or 8, characterized in that said scintillation processing stage comprises three unpiling calculation circuits receiving said digital signals $X_{mj}$, $Y_{mj}$, $Z_{mj}$ or $Z_{mj}$, $Y_{mj}$, $E_{mj}$, respectively, and supplying three signals $X_j$, $Y_j$, $Z_j$, or $X_j$, $Y_j/E_j$ respectively, and two dividers supplying two signals $x_j = X_j/Z_j$ and $y_j = Y_j/Z_j$ or $x_j = X_j/E_j$ and $y_j = Y_j/E_j$, respectively, said three signals $x_j$, $y_j$, $E_j$ being formed by the output signals of the first divider, the second divider and a time realignment circuit, respectively, said time realignment circuit receiving the output signal of the last unpiling calculation circuit, the correction coefficients being coefficients for correction by extrapolation and interpolation, $\alpha$ and $\gamma$, respectively for the three unpiling calculation circuits of the scintillation processing stage.

10. A scintillation camera as claimed in claim 9, characterized in that each of said three unpiling calculation circuits comprises a subtractor having a first input receiving the corresponding output signal of the digital summing stage, said subtractor being followed by a first multiplier and a first storage register and by a second multiplier and a second storage register connected parallel to the first multiplier and the first storage register, the output of the second register being connected to the second input of said subtractor, the second input of said first multiplier being connected to the output of a memory for storing the coefficient $\alpha$ and the second input of the second multiplier is connected to the output of a memory for storing the coefficient $\gamma$.

11. A scintillation camera as claimed in claim 10, characterized in that said multipliers are replaced by a single multiplier circuit associated with a time multiplexer/demultiplexer.

12. A scintillation camera as claimed in claim 9, characterized in that each of said three unpiling calculation circuits comprises a subtractor having a first input receiving the corresponding output signal of the digital summing device, said subtractor being followed by a third storage register whose output is that of the unpiling calculation circuit and, in parallel, by a third multiplier and a fourth storage register, the output of the fourth storage register being connected to the second input of said subtractor, the other input of the third multiplier being connected to the output of a memory for storing the coefficient $\gamma$.

13. A scintillation camera as claimed in claim 7 or 8, characterized in that said scintillation processing stage comprises three unpiling calculation circuits, two dividers, a time realignment circuit, and an additional calculation circuit, said two dividers receiving the signals $X_{mj}$, $Y_{mj}$, $Z_{mj}$ in order to supply two signals $x_{mj} = X_{mj}/Z_{mj}$ and $y_{mj} = Y_{mj}/Z_{mj}$ or the signals $X_{mj}$, $Y_{mj}$, $E_{mj}$, respectively, or, in order to supply two signals $x_{mj} = X_{mj}/E_{mj}$ and $y_{mj} = Y_{mj}/E_{mj}$, respectively, the first two unpiling calculation circuits receiving said signals $x_{mj}$, $y_{mj}$ and supplying the signals x, y, and the third unpiling calculation circuit receiving the signal $Z_m$ or $E_m$ and supplying the signal $\hat{E}$, said additional calculation circuit receiving said signal E and said correction coefficients in order to supply the first and the second unpiling calculation circuit with an additional correction coefficient $\Gamma$.

14. A scintillation camera as claimed in claims 1, 7 or 8, characterized in that said dividers are replaced by a single divider circuit associated with a time multiplexer/demultiplexer.

15. A scintillation camera as claimed in claims 1, 7, or 8, characterized in that said unpiling calculation circuits are replaced by a single unpiling calculation circuit in association with a time multiplexer/demultiplexer.

16. A scintillation camera as claimed in claims 1, 7, or 8, characterized in that an amplitude rejection circuit is provided for reducing the number of scintillations to be processed.

17. A scintillation camera as claimed in claims 1, 7 or 8, characterized in that FIFO memories are connected to the output of each of the p acquisition channels or upstream from each of said digital weighted sum forming devices.

18. A scintillation camera as claimed in claims 1, 7 or 8, characterized in that said bus is connected to said processor without being included therein.

* * * * *